(12) United States Patent
Jetzfellner et al.

(10) Patent No.: US 12,117,787 B2
(45) Date of Patent: Oct. 15, 2024

(54) METHOD AND CONTROL SYSTEM FOR CONTROLLING AN EXECUTION OF TRANSACTIONS

(71) Applicant: Siemens Aktiengesellschaft, Munich (DE)

(72) Inventors: Thomas Jetzfellner, Aschheim (DE); Markus Sauer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 289 days.

(21) Appl. No.: 17/599,351

(22) PCT Filed: Mar. 17, 2020

(86) PCT No.: PCT/EP2020/057235
§ 371 (c)(1),
(2) Date: Sep. 28, 2021

(87) PCT Pub. No.: WO2020/207717
PCT Pub. Date: Oct. 15, 2020

(65) Prior Publication Data
US 2022/0179384 A1 Jun. 9, 2022

(30) Foreign Application Priority Data
Apr. 12, 2019 (EP) .................................. 19168963

(51) Int. Cl.
*G05B 19/042* (2006.01)
(52) U.S. Cl.
CPC .................. *G05B 19/0423* (2013.01); *G05B 2219/24081* (2013.01)
(58) Field of Classification Search
CPC ...... G05B 19/0423; G05B 2219/24081; G06N 7/00; G06N 20/00; G06Q 10/06; G06F 3/167; G06F 9/466
See application file for complete search history.

(56) References Cited

U.S. PATENT DOCUMENTS

2016/0299918 A1 10/2016 Ford
2019/0116142 A1* 4/2019 Chalakudi ............. H04L 51/046
(Continued)

FOREIGN PATENT DOCUMENTS

CN 107103054 A 8/2017
CN 107924389 A 4/2018
(Continued)

OTHER PUBLICATIONS

Zhang, Y., Xu, X., Liu, A., Lu, Q., Xu, L. and Tao, F., 2019. Blockchain-based trust mechanism for IoT-based smart manufacturing system. IEEE Transactions on Computational Social Systems, 6(6), pp. 1386-1394. (Year: 2019).*
(Continued)

*Primary Examiner* — Alicia M. Choi
(74) *Attorney, Agent, or Firm* — Schmeiser, Olsen & Watts LLP

(57) ABSTRACT

The possibility of using a blockchain for industrial applications, in particular in the manufacturing sector, is provided. For example, time requirements are specified by the configurability and the selectability of the validation and/or transmission. The distributed database system only validates those transactions which are executed by a corresponding blockchain-based manufacturing system, by a number of nodes confirming that they execute the transactions. The provided is suitable in particular for blockchain IoT applications in which at least one device is intended to execute some kind of control action, and the execution is subject to certain requirements.

20 Claims, 3 Drawing Sheets

(56) References Cited

U.S. PATENT DOCUMENTS

| | | | |
|---|---|---|---|
| 2020/0293361 A1 | 9/2020 | Falk | |
| 2021/0256513 A1* | 8/2021 | Lu | G06Q 20/065 |
| 2021/0409201 A1* | 12/2021 | Mondello | H04L 9/3239 |

FOREIGN PATENT DOCUMENTS

| | | | | |
|---|---|---|---|---|
| CN | 109359159 A | | 2/2019 | |
| DE | 102016015766 A1 | | 11/2017 | |
| EP | 3462313 A1 | | 4/2019 | |
| KR | 20110136949 A | * | 12/2011 | H04L 9/321 |
| WO | WO-2016201987 A1 | * | 12/2016 | H04L 1/14 |
| WO | 2017145006 A1 | | 8/2017 | |
| WO | WO-2019001214 A1 | * | 1/2019 | H04L 29/08 |

OTHER PUBLICATIONS

Baird Leemon: "Overview of Swirlds Hashgraph", Swirlds; 2016.

Andreas M. Antonopoulos Mastering Bitcoin: Unlocking Digital Cryptocurrencies , O'Reilly Media, Dec. 2014.

Konstantinos, Christidis et al. "Blockchains and Smart Contracts for the Internet of Things" IEEE Access, vol. 4, pp. 2292-2303, 2016 // DOI: 10.1109/ACCESS.2016.2566339.

Joseph Poon, Thaddeus Dryja: The Bitcoin Lightning Network: Scalable Off-Chain Instant Payments. Jan. 14, 2016, abgeru-fen am Jun. 30, 2018 (PDF; 3 MB, englisch).; 2016.

Anderson Ross: "Security Engineering. A Guide to Building Dependable Distributed Systems"; Wiley; Jan. 2001; 2001.

BLOCKCHAINHUB: "Blockchain Oracles", https://blockchainhub.net/blockchain-oracles/; 2018.

Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470.

Baird Leemon: "The Swirlds Hashgraph Consensus Algorithm: Fair, Fast, Byzantine Fault Tolerance", Swirlds Tech Report SWIRLDS-TR-2016-01; 2016.

Needham Roger M et al: "Using encryption for authentication in large networks of computers", ACM: Communications of the ACM, vol. 21, No. 12, Dec. 1978; 1978.

GitHub/ "The Ethereum Book Project/Mastering Ethereum" https://github.com/ethereumbook/ethereumbook, Stand Jun. 10, 2017; 2017.

PCT International Search Report and Written Opinion of International Searching Authority mailed (Jun. 17, 2020 corresponding to PCT International Application No. PCT/EP2020/057235 filed Mar. 17, 2020.

Sharma Vishal:; "An Energy-Efficient Transaction Model for the Blockchain-Enabled Internet of Vehicles (IoV)"; IEEE Communications Letters; vol. 23; No. 2; Feb. 2019.

Zhou Yonglin:; "Blockchain Finance: Virtual Currency Creats a new Financial Blueprint"; May 31, 2016.

* cited by examiner

METHOD AND CONTROL SYSTEM FOR CONTROLLING AN EXECUTION OF TRANSACTIONS

CROSS-REFERENCE TO RELATED APPLICATIONS

This application claims priority to PCT Application No. PCT/EP2020/057235, having a filing date of Mar. 17, 2020, which is based off of EP Application No. 19168963.7, having a filing date of Apr. 12, 2019, the entire contents both of which are hereby incorporated by reference.

FIELD OF TECHNOLOGY

The following relates to a method and a control system for controlling an execution of transactions.

BACKGROUND

The disclosed addresses using a blockchain for industrial applications, in particular in the manufacturing sector.

SUMMARY

An aspect relates to form an alternative to the relevant art.
Aspects of embodiments of the invention are explained below.
In accordance with a first aspect, embodiments of the invention relate to an apparatus comprising:
a first receiving module, wherein
the first receiving module is configured for receiving a transaction,
the transaction comprises control commands,
the control commands are intended to be executed in particular by one or a plurality of devices of a network application;
a determining module, wherein
the determining module is configured to determine one device or a plurality of devices which in each case wholly or partly execute the control commands,
the determining module is configured to communicate to the device or the plurality of devices a request message for execution of the corresponding control commands,
a second receiving module, wherein
the second receiving module is configured for receiving confirmation messages,
the confirmation messages are responses of the device or of the plurality of devices to the request message;
a providing module, wherein
the providing module is configured to provide the transaction and/or the control commands on the basis of the confirmation messages as control transaction or as a plurality of control transactions.
By way of example, during providing, the control transaction or the control commands can be stored in a network application.
The apparatus can be realized for example by means of a network application and/or a distributed database system and/or a blockchain or a combination of the possibilities mentioned. The apparatus can for example also be a network application or a distributed database system or a blockchain or be realized as such. By way of example, the first receiving module and/or the determining module and/or the second receiving module and/or the providing module can be realized by means of a network application and/or a distributed database system and/or a blockchain. By way of example, a network application and/or a distributed database system and/or a blockchain can comprise the apparatus or one or more modules of the apparatus.

The technology of blockchains or "distributed ledgers" is currently a technology that is being intensively discussed and that can be realized in particular as a distributed database system or as a network application. Besides applications for decentralized payment systems (e.g., Bitcoin), new application possibilities are being developed in the financial industry. In particular, transactions between companies can be realized by this means without mediators or a clearing house, in a manner protected against manipulation. This enables new business models without a trustworthy mediator, it reduces the transaction costs, and new digital services can be offered in a flexible manner, without the need to set up trust relationships and an infrastructure set up specifically for this. A transaction data set (or transaction for short) protected by a blockchain comprises program code, for example, which can also be referred to as a so-called "smart contract".

Unless indicated otherwise in the following description, the terms "carry out", "calculate", "computer-aided", "compute", "ascertain", "generate", "configure", "reconstruct" and the like relate to actions and/or processes and/or processing steps which change and/or generate data and/or convert data into other data, wherein the data can be represented or be present in particular as physical variables, for example as electrical pulses. In particular, the expression "computer" should be interpreted as broadly as possible to cover in particular all electronic devices having data processing properties. Computers can thus be for example personal computers, servers, programmable logic controllers (PLCs), handheld computer systems, pocket PC devices, IoT devices, mobile radio devices and other communication devices which can process data in a computer-aided manner, processors and other electronic devices for data processing.

In association with embodiments of the invention, "computer-aided" can be understood to mean for example an implementation of the method in which in particular a processor performs at least one method step of the method.

In association with embodiments of the invention, a processor can be understood to mean for example a machine or an electronic circuit. A processor can be in particular a central processing unit (CPU), a microprocessor or a microcontroller, for example an application-specific integrated circuit or a digital signal processor, possibly in combination with a storage unit for storing program instructions, etc. A processor can for example also be an IC (Integrated Circuit), in particular an FPGA (Field Programmable Gate Array) or an ASIC (Application-Specific Integrated Circuit), or a DSP (Digital Signal Processor) or a graphic processing unit (GPU). Moreover, a processor can be understood to mean a virtualized processor, a virtual machine or a soft CPU. It can for example also be a programmable processor which is equipped with configuration steps for performing the stated method according to embodiments of the invention or is configured with configuration steps in such a way that the programmable processor implements the features according to embodiments of the invention of the method, of the component, of the modules, or of other aspects and/or partial aspects of embodiments of the invention.

In association with embodiments of the invention, a "storage unit" or "storage module" and the like can be understood to mean for example a volatile memory in the form of main memory (Random-Access Memory, RAM) or a permanent memory such as a hard disk or a data carrier.

In association with embodiments of the invention, a "module" can be understood to mean for example a processor and/or a storage unit for storing program instructions. By way of example, the processor is specifically designed to execute the program instructions in such a way that the processor executes functions of the corresponding module or for implementing or realizing the method according to embodiments of the invention or a step of the method according to embodiments of the invention. By way of example, a processor can be designed in such a way that it realizes the functions of a plurality of modules.

A module can for example also be a node of the distributed database system that realizes for example the specific functions/features of a corresponding module. The respective modules can for example also be embodied as separate or independent modules. For this purpose, the corresponding modules can comprise further elements, for example. These elements are for example one or more interfaces (e.g., database interfaces, communication interfaces—e.g., network interface, WLAN interface) and/or an evaluation unit (e.g., a processor) and/or a storage unit. By means of the interfaces, for example, data can be exchanged (e.g., received, communicated, transmitted or provided). By means of the evaluation unit, data can be compared, checked, processed, assigned or calculated for example in a computer-aided manner and/or in an automated manner. By means of the storage unit, data can be stored, retrieved or provided for example in a computer-aided manner and/or in an automated manner.

In association with embodiments of the invention, "comprise", in particular with regard to data and/or information, can be understood to mean for example (computer-aided) storage of corresponding information and/or of a corresponding datum in a data structure/data set (which e.g., is in turn stored in a storage unit).

In association with embodiments of the invention, "assign", in particular with regard to data and/or information, can be understood to mean for example a computer-aided assignment of data and/or information. By way of example, a first datum, for this purpose, by means of a storage address or a unique identifier (UID), is assigned a second datum e.g., by the first datum being stored together with the storage address or the unique identifier of the second datum together in a data set.

In association with embodiments of the invention, "provide", in particular with regard to data and/or information, can be understood to mean for example computer-aided providing. The providing is effected for example via an interface (e.g., a database interface, a network interface, an interface to a storage unit). Via said interface, for example, during providing, corresponding data and/or information can be communicated and/or transmitted and/or retrieved and/or received.

In association with embodiments of the invention, "provide" can also be understood to mean for example loading or storing, for example a transaction with corresponding data. This can be done for example on or by a storage module. "Providing" can for example also be understood to mean transferring (or transmitting or communicating) corresponding data from one node to another node of the blockchain or of the distributed database system (or the infrastructure thereof) or of the network application.

In association with embodiments of the invention, a "checksum", for example a data block checksum, a data checksum, a node checksum, a transaction checksum, a linking checksum or the like, can be understood to mean for example a cryptographic checksum or cryptographic hash or hash value that is formed or calculated in particular by means of a cryptographic hash function by way of a data set and/or data and/or one or more of the transactions and/or a partial area of a data block (e.g., the block header of a block of a blockchain or data block header of a data block of the distributed database system (or of the network application) or only a portion of the transactions of a data block). A checksum can be in particular (a) checksum(s) or hash value(s) of a hash tree (e.g., Merkle tree, Patricia tree). Furthermore, it can also be understood to mean in particular a digital signature or a cryptographic message authentication code. By means of the checksums, at different levels of the database system, for example, it is possible to realize cryptographic protection/protection against manipulation for the transactions and the data (sets) stored therein. If high security is required, for example, the checksums are generated and checked at the transaction level, for example. If the security required is not as high, the checksums are generated and checked for example at the block level (e.g., over the entire data block or only over a portion of the data block and/or a portion of the transactions).

In association with embodiments of the invention, a "data block checksum" can be understood to mean a checksum that is calculated for example over a portion or all transactions of a data block. A node can then check/establish the integrity/authenticity of the corresponding portion of a data block by means of the data block checksum, for example. Additionally or alternatively, the data block checksum may in particular also have been formed over transactions of a preceding data block/predecessor data block of the data block. In this case, the data block checksum can in particular also be realized by means of a hash tree, for example a Merkle tree [1] or a Patricia tree, wherein the data block checksum is in particular the root checksum of the Merkle tree or of a Patricia tree or of a binary hash tree. In particular, transactions are safeguarded by means of further checksums from the Merkle tree or Patricia tree (e.g., using the transaction checksums), wherein in particular the further checksums are leaves in the Merkle tree or Patricia tree. The data block checksum can thus safeguard the transactions for example by the root checksum being formed from the further checksums. The data block checksum can be calculated in particular for transactions of a specific data block of the data blocks. In particular, such a data block checksum can influence a data block succeeding the specific data block in order to link this succeeding data block for example with its preceding data blocks and in particular thus to make an integrity of the distributed database system (or of the network application) checkable. By this means, the data block checksum can for example perform the function of the linking checksum or influence the linking checksum. The header of a data block (e.g., of a new data block or of the data block for which the data block checksum was formed) can comprise the data block checksum, for example.

In association with embodiments of the invention, "transaction checksum" can be understood to mean a checksum which is formed in particular over a transaction of a data block. In addition, for example a calculation of a data block checksum for a corresponding data block can be accelerated since, for this purpose, for example already calculated transaction checksums can be used straightaway as leaves of a Merkle tree, for example.

In association with embodiments of the invention, a "linking checksum" can be understood to mean a checksum which indicates or references in particular a respective data block of the distributed database system (or of the network application) the preceding data block of the distributed database system (or of the network application) (often referred to as "previous block hash", in particular, in the technical literature) [1]. For this purpose, a corresponding linking checksum is formed in particular for the corresponding preceding data block. As linking checksum, for example, a transaction checksum or the data block checksum of a data block (that is to say a present data block of the distributed database system or of the network application) can be used to link a new data block with a (present) data block of the distributed database system (or of the network application). However, it is also possible, for example, for a checksum to be formed over a header of the preceding data block or over the entire preceding data block and to be used as linking checksum. This can for example also be calculated for a plurality or all of the preceding data blocks. It is also possible to realize a procedure for example in which the linking checksum is formed over the header of a data block and the data block checksum. However, a respective data block of the distributed database system (or of the network application) comprises in each case a linking checksum which was calculated, or refers to, a data block preceding the respective data block, in particular the data block directly preceding the respective data block. It is also possible, for example, for a corresponding linking checksum also to be formed only over a portion of the corresponding data block (e.g., preceding data block). As a result, a data block comprising an integrity-protected portion and an unprotected portion can be realized, for example. A data block whose integrity-protected portion is invariable and whose unprotected portion can also still be changed later (in order e.g., still to store personal data in the unprotected portion) could thus be realized, for example. In this case, integrity-protected should be understood to mean in particular that an alteration of integrity-protected data is able to be established by means of a checksum.

The data which are stored in a transaction of a data block, for example, can be provided in particular in various ways. Instead of the data, e.g., user data such as measurement data or data/ownership concerning assets, for example a transaction of a data block can comprise only the checksum for these data. In this case, the corresponding checksum can be realized in various ways. This can be e.g., a corresponding data block checksum of a data block (with the corresponding data) of a different database or of the distributed database system (or of the network application), a transaction checksum of a data block with the corresponding data (of the distributed database system or of the network application or of a different database) or a data checksum that was formed over the data.

In addition, the corresponding transaction can also comprise a reference or an indication concerning a storage location (e.g., an address of a file server and indications of where the corresponding data may be found on the file server; or an address of a different distributed database or of a different network application comprising the data). The corresponding data could then for example also be provided in a further transaction of a further data block of the distributed database system or of the network application (e.g., if the corresponding data and the associated checksums are comprised in different data blocks). However, it is also conceivable, for example, for these data to be provided via a different communication channel (e.g., via a different database and/or a cryptographically secure communication channel).

Moreover, in addition to the checksum, for example, it is possible to store an additional data set (e.g., a reference or an indication concerning a storage location) in the corresponding transactions, which indicates in particular a storage location where the data can be retrieved. That is advantageous in particular so as to minimize a data size of the blockchain or of the distributed database system or of the network application.

In association with embodiments of the invention, "security-protected" can be understood to mean for example protection that is realized by a cryptographic method, in particular. By way of example, this can be realized by use of the distributed database system (or of the network application) for providing or transferring or transmitting corresponding data/transactions. This is achieved by means of a combination of the different (cryptographic) checksums by virtue of the latter interacting synergistically, in particular, in order to improve for example the security or the cryptographic security for the data of the transactions. In other words, in association with embodiments of the invention, "security-protected" can in particular also be understood to mean "cryptographically protected" and/or "manipulation-protected", wherein "manipulation-protected" can also be referred to as "integrity-protected".

In association with embodiments of the invention, "linking (the) data blocks of a distributed database system or of a network application" can be understood to mean for example that data blocks each comprise information (e.g., linking checksum) that refers to or references one other data block or a plurality of other data blocks of the distributed database system (or of the network application) [1] [4] [5].

In association with embodiments of the invention, "inserting into the distributed database system or the network application" and the like can be understood to mean for example that in particular a transaction or the transactions or a data block with its transactions is/are communicated to one or more nodes of a distributed database system or of a network application. If these transactions are validated successfully (e.g., by the node(s)), for example, these transactions are linked in particular as a new data block with at least one present data block of the distributed database system or of the network application [1] [4] [5]. For this purpose, the corresponding transactions are stored in a new data block, for example. In particular, this validating and/or linking can be effected by a trustworthy node (e.g. a mining node, a blockchain oracle or a blockchain platform). In particular, a blockchain platform can be understood here to mean a blockchain as service, as proposed in particular by Microsoft or IBM. In particular, a trustworthy node and/or a node can in each case store a node checksum (e.g., a digital signature) in a data block (e.g. in the data block generated and validated by them, which is then linked) in order in particular to enable an identifiability of the creator of the data block and/or to enable an identifiability of the node. In this case, said node checksum indicates which node has linked for example the corresponding data block with at least one other data block of the distributed database system (or of the network application).

In association with embodiments of the invention, "transaction" or "transactions" can be understood to mean for example a smart contract [4] [5], a data structure or a transaction data set that comprises in particular in each case one of the transactions or a plurality of transactions. By way of example, a corresponding transaction can also comprise a smart contract. In association with embodiments of the invention, "transaction" or "transactions" can for example also be understood to mean the data of a transaction of a data block of a blockchain. A transaction can comprise in particular a program code that realizes a smart contract, for example. By way of example, in association with embodiments of the invention, transaction can also be understood to mean a control transaction and/or a confirmation transaction with a confirmation message and/or an execution confirmation transaction with an execution confirmation message. An execution confirmation message can comprise for example a confirmation for an execution of the control commands of the control transaction by one of the devices if a corresponding device of the devices has successfully executed the control commands of the control transaction. For this purpose, the execution confirmation message can comprise for example a checksum generated by the corresponding device (e.g., a transaction checksum) over the executed control commands and/or can comprise a confirmation of the execution, which e.g. is likewise protected by the checksum. An execution confirmation message can for example also be stored in the distributed database system or the network application if the device partly executes the control commands and/or the execution of the control commands is interrupted. This may be the case e.g., if a defect occurred at the device during the execution of the control commands, which defect no longer allows the execution of the control commands (e.g., a defect occurred at an actuator or tool). By way of example, a different device, which satisfies the execution requirements for the remaining unexecuted control commands, for example, can then execute these unexecuted control commands of the corresponding control transaction on the basis of the execution confirmation message. Accordingly, the execution confirmation message can comprise for example the degree of execution or an indication regarding the executed portion of the control commands. Alternatively or additionally, an execution confirmation message can indicate the control commands which still have to be executed for a successful execution of the control commands of a corresponding control transaction. Accordingly, by way of example, an execution confirmation message can comprise a data set indicating which of the control commands are still to be executed or indicating which of the control commands are missing for the successful execution of the control commands for a corresponding control transaction. This makes it possible, for example, that further processing of the control commands can be effected even if the execution of the control commands was interrupted at a device. Accordingly, by way of example, the execution requirements can demand that more than one device (e.g., two or three devices or more devices) satisfy the execution requirements in order that an execution of the control commands is actually guaranteed, even if e.g., a device fails during the execution of the control commands of a corresponding control transaction.

Alternatively, a transaction can be for example a data structure that stores data (e.g., the control commands). A transaction can for example also be referred to as a message (that is to say a communication message that stores data) or be a message that stores e.g., corresponding data (e.g. control commands). Embodiments of the invention thus enable corresponding transactions or messages to be exchanged. In this case, transactions can comprise e.g., the control commands and/or contract data and/or other data such as video data, user data, measurement data, etc.

In particular, "storing transactions in data blocks", "storing transactions" and the like should be understood to mean direct storing or indirect storing. In this case, direct storing can be understood to mean for example that the corresponding data block (of the distributed database system or of the network application) or the corresponding transaction (of the distributed database system or of the network application) comprises the respective data. In this case, indirect storing can be understood to mean for example that the corresponding data block or the corresponding transaction comprises a checksum and optionally an additional data set (e.g., a reference or an indication concerning a storage location) for corresponding data and, consequently, the corresponding data are not stored directly in the data block (or the transaction) (i.e., instead only a checksum for these data). In particular, when storing transactions in data blocks, it is possible to validate these checksums, for example, as explained for example under "inserting into the distributed database system or the network application".

In association with embodiments of the invention, a "program code" (e.g., a smart contract or chain code) can be understood to mean for example one program instruction or a plurality of program instructions, which are stored in particular in one or a plurality of transactions. The program code is executable, in particular, and is executed by the distributed database system or the network application, for example. This can be realized by means of an execution environment (e.g., of a virtual machine), for example, wherein the execution environment and respectively the program code are Turing complete. The program code is executed by the infrastructure of the distributed database system or of the network application [4] [5]. In this case, for example, a virtual machine is realized by the infrastructure of the distributed database system (or of the network application).

In association with embodiments of the invention, a "smart contract" can be understood to mean for example an executable program code [4] [5] (see, in particular, the definition of "program code"). The smart contract is stored in a transaction of a distributed database system or of the network application (e.g., a blockchain), for example in a data block of the distributed database system (or of the network application). By way of example, the smart contract can be executed in the same way as explained in the definition of "program code", in particular in association with the invention.

In association with embodiments of the invention, "smart contract process" can be understood to mean in particular execution of a program code (e.g., of the control commands) in a process by the distributed database system or by the network application, wherein for example the corresponding infrastructure of the distributed database system or of the network application executes the program code.

In association with embodiments of the invention, "proof-of-work verification" can be understood to mean for example solving a computationally intensive task which is to be solved in particular depending on the data block content/content of a specific transaction [1] [4] [5]. Such a computationally intensive task is for example also referred to as a cryptographic puzzle.

In association with embodiments of the invention, a "network application" can be understood to mean for example a decentralized distributed database, a distributed database system, a distributed database, a peer-to-peer application, a distributed memory management system, a blockchain, a distributed ledger, a distributed storage system, a distributed ledger technology (DLT) based system (DLTS), an audit-proof database system, a cloud, a cloud service, a blockchain in a cloud or a peer-to-peer database. By way of example, a network application can be a distributed database system that is realized e.g., by means of a blockchain or a distributed ledger. Moreover, it is possible to use, for example, various implementations of a blockchain or a DLTS, such as e.g., a blockchain or a DLTS implemented by means of a directed acyclic graph (DAG), a cryptographic puzzle, a Hashgraph or a combination of the implementation variants mentioned [6] [7]. Moreover, various consensus methods (referred to as consensus algorithms) can be implemented, for example. This can be for example a consensus method by means of a cryptographic puzzle, gossip about gossip, virtual voting or a combination of the methods mentioned (e.g., gossip about gossip combined with virtual voting) [6] [7]. If a blockchain is used, for example, then this can be implemented in particular by means of a Bitcoin-based realization or an Ethereum-based realization [1] [4] [5]. A "distributed database system" or a "network application" can for example also be understood to mean a distributed database system or a network application of which at least some of its nodes and/or devices and/or infrastructure are realized by a cloud. By way of example, the corresponding components are realized as nodes/devices in the cloud (e.g., as a virtual node in a virtual machine). This can be effected for example by means of VM-Ware, Amazon Web Services or Microsoft Azure. On account of the high flexibility of the implementation variants explained, in particular partial aspects of the implementation variants mentioned can also be combined with one another, e.g., by using a Hashgraph as a blockchain, wherein the blockchain itself can e.g. also be blockless.

If for example a directed acyclic graph (DAG) is used (e.g., IOTA or Tangle), in particular transactions or blocks or nodes of the graph are connected to one another via directed edges. Acyclic here means, in particular, that there are no directed loops in the graph.

The distributed database system or the network application can be for example a public distributed database system or a public network application (e.g., a public blockchain) or a closed (or private) distributed database system or a closed network application (e.g. a private blockchain).

If a public distributed database system or a public network application is involved, for example, this means that new nodes and/or devices can join the distributed database system or the network application or be accepted thereby without authorization verifications or without authentication or without log-on information or without credentials. In particular, the operators of the nodes and/or devices can remain anonymous in such a case.

If the distributed database system or the network application is a closed distributed database system, for example, new nodes and/or devices require for example a valid authorization verification and/or valid authentication information and/or valid credentials and/or valid log-on information in order to be able to join the distributed database system or the network application or in order to be accepted thereby.

A distributed database system or the network application can also be for example a distributed communication system for data exchange. This can be for example a network or a peer-to-peer network.

A/The distributed database system can for example also be a decentralized distributed database system and/or a decentralized distributed communication system.

A "network application" can for example also be a network application infrastructure or the network application comprises a corresponding network application infrastructure. This infrastructure can comprise for example nodes and/or communication networks and/or data interfaces and/or further components in order to realize or implement the network application. The network application can be e.g., a distributed network application (e.g., a distributed peer-to-peer application or a distributed database system) which is implemented for example on a plurality of nodes of the network application infrastructure.

In association with embodiments of the invention, "data block", which can also be referred to as "link" or "block" in particular depending on context and realization, can be understood to mean for example a data block of a distributed database system or of a network application (e.g. a blockchain or a peer-to-peer database), which in particular is realized as a data structure and comprises in each case one of the transactions or a plurality of the transactions. In one implementation, for example, the database (or the database system) can be a DLT based system (DLTS) or a blockchain and a data block can be a block of the blockchain or of the DLTS. A data block can comprise for example indications concerning the size (data size in bytes) of the data block, a data block header, a transaction counter and one or more transactions [1]. The data block header can comprise for example a version, a linking checksum, a data block checksum, a time stamp, a proof-of-work verification and a nonce (one-off value, random value or counter used for the proof-of-work verification) [1] [4] [5]. A data block can for example also be only a specific storage area or address area of the entire data stored in the distributed database system or the network application. It is thus possible to realize for example blockless distributed database systems or network applications, such as e.g., the IoT chain (ITC), IOTA, and Byteball. In this case, in particular, the functionalities of the blocks of a blockchain and of the transactions are combined with one another in such a way that e.g., the transactions themselves safeguard the sequence or chain of transactions (of the distributed database system or of the network application) (that is to say, in particular, are stored in a security-protected manner). For this purpose, with a linking checksum, for example, the transactions themselves can be linked with one another, by a separate checksum or the transaction checksum of one or more transactions serving as linking checksum, which is concomitantly stored in the corresponding new transaction when a new transaction is stored in the distributed database system or the network application. In such an embodiment, a data block can for example also comprise one or more transactions, wherein in the simplest case for example a data block corresponds to a transaction. By way of example, in addition to a checksum over the transactions, a checksum over the "state", i.e., the states of the smart contracts and/or of the accounts and/or over the return values of the transactions (referred to as transaction receipts), can also be inserted e.g. into the transaction and/or the data block.

In association with embodiments of the invention, "nonce" can be understood to mean for example a cryptographic nonce (abbreviation of: "used only once" [2] or "number used once" [3]). In particular, a nonce denotes an individual combination of numbers or letters that is used once in the respective context (e.g., transaction, data transfer).

In association with embodiments of the invention, "data blocks preceding a (specific) data block of the distributed database system or of the network application" can be understood to mean for example that data block of the distributed database system or of the network application which directly precedes in particular a (specific) data block. Alternatively, "data blocks preceding a (specific) data block of the distributed database system or of the network application" can in particular also be understood to mean all data blocks of the distributed database system or of the network application which precede the specific data block. As a result, by way of example, the linking checksum or the transaction checksum can be formed in particular only over the data block (or the transactions thereof) directly preceding the specific data block or over all data blocks (or the transactions thereof) preceding the first data block.

In association with embodiments of the invention, a "blockchain node", "node", "node of a distributed database system or of the network application" and the like can be understood to mean for example devices (e.g., field devices, cellular phones), computers, smartphones, clients or subscribers that carry out operations with the distributed database system or the network application (e.g. a blockchain) [1] [4] [5]. Such nodes can for example execute transactions of a distributed database system or of a network application or the data blocks thereof or introduce or link new data blocks with new transactions into the distributed database system or the network application by means of new data blocks. In particular, this validating and/or linking can be effected by a trustworthy node (e.g. a mining node) or exclusively by trustworthy nodes. A trustworthy node is for example a node that has additional security measures (e.g., firewalls, access restrictions to the node or the like) in order to prevent a manipulation of the node. Alternatively or additionally, by way of example, during the linking of a new data block with the distributed database system or the network application, a trustworthy node can store a node checksum (e.g. a digital signature or a certificate) in the new data block. The node checksum here can be for example a checksum e.g., of a data block or of a transaction, said checksum being signed by a corresponding node. A verification can thus be provided, in particular, which indicates that the corresponding data block was inserted by a specific node or indicates its origin. The devices (e.g., the corresponding device) are for example devices of a technical system and/or an industrial installation and/or an automation network and/or a manufacturing installation which in particular are also a node of the distributed database system or of the network application. In this case, the devices can be for example field devices or devices in the Internet of Things which in particular are also a node of the distributed database system or of the network application. Nodes can for example also comprise at least one processor in order to carry out e.g., their computer-implemented functionality.

In association with embodiments of the invention, a "blockchain oracle" and the like can be understood to mean for example nodes, devices or computers that have e.g. a security module comprising for example software protection mechanisms (e.g. cryptographic methods), mechanical protection devices (e.g. a lockable housing) or electrical protection devices (e.g. tamper protection or a protection system that erases the data of the security module in the event of impermissible use/handling of the blockchain oracle). In this case, the security module can comprise cryptographic keys, for example, which are necessary e.g., for the signature of the transaction and/or for calculating the checksums (e.g. transaction checksums or node checksums).

In association with embodiments of the invention, a "computer" or a "device" can be understood to mean for example a computer (system), a client, a smartphone, a server, each of which is arranged outside the blockchain or is not a subscriber of the distributed database system or of the network application (e.g. of the blockchain) (that is to say does not carry out operations with the distributed database system or the network application or only interrogates the latter, but without carrying out transactions, inserting data blocks or calculating proof-of-work verifications). Alternatively, a computer can in particular also be understood to mean a node of the distributed database system or of the network application. In other words, a device can in particular be understood to mean a node of the distributed database system or of the network application or else a device outside the blockchain or the distributed database system or the network application. A device outside the distributed database system or the network application can for example access the data (e.g., transactions or control transactions) of the distributed database system or of the network application and/or be driven by nodes (e.g., by means of a smart contract and/or blockchain oracle). If for example driving or control of a device (e.g., a device embodied as a node or a device outside the distributed database system or the network application) is realized by a node, this can be effected e.g., by means of a smart contract stored in particular in a transaction of the distributed database system or of the network application. A computer or a device can for example also be a part of the infrastructure which implements, realizes or comprises e.g., the network application or the distributed database system.

In association with embodiments of the invention, "control commands" or "control transactions" can be understood to mean for example a smart contract [4][5] or executable program code which is executed in particular by the network application or the distributed database system or by corresponding devices, wherein for example the distributed database system or its nodes and infrastructure process or implement the corresponding control commands. In particular, a plurality of control commands or control transactions composed of one or more data blocks produce a command sequence. By means of the control commands, in particular a manufacturing installation with the associated manufacturing machines (e.g., devices) is controlled, the devices of an automation network are controlled or the devices of a power supply system are controlled or devices in the Internet of Things are controlled. In particular, the manufacturing instructions or manufacturing steps for a product and the production thereof are encoded in the control commands or control transactions (that is to say also in the command sequences). With the control commands or control transactions, devices are controlled, for example, by virtue of a device executing the corresponding control commands, for example. The devices (e.g., the corresponding device) are for example devices of a technical system and/or of an industrial installation and/or of an automation network and/or of a manufacturing installation and/or devices in the Internet of Things, which in particular are also a node of the distributed database system. In this case, the devices can be field devices, for example, which in particular are also a node of the distributed database system. The devices can also be automated teller machines, for example, wherein the control commands instigate a cash withdrawal. By way of example, the control commands can be derived from or determined from a command sequence. By way of example, a control transaction can comprise one or a plurality of control commands. By way of example, the control commands encode mechanical movement and/or other physical variables (e.g., pressure or temperature), which are converted into the corresponding mechanical movement and/or the corresponding other physical variables by a corresponding device/node (e.g., by means of a corresponding actuator). By way of example, actuators of the devices and/or nodes are then controlled with the control commands. Accordingly, a corresponding device/node comprises an actuator, for example. If a device/node is a robot, for example, then an actuator would also be referred to as an effector. A device can for example also be a mechatronic device or system, wherein a mechatronic device/system is for example an actuator and/or a linear-technological device. A linear-technological device is for example a device for carrying out translational movements. A corresponding device can for example also be a drive system. By means of the control commands and the devices and/or nodes, a control loop can for example also be controlled by closed-loop and/or open-loop control, for example by the execution confirmation messages for executed control commands being evaluated by the apparatus or by the network application and corresponding control commands being generated as a reaction to the execution confirmation messages. For these new control commands, then for example corresponding execution requirements are again determined or retrieved and they are then assigned again to control transactions, for example, in order that the latter are taken into account for example—as described in embodiments of the invention—by the corresponding devices for the execution of the control commands. The control commands can for example also be control commands for controlling cryptographic devices and/or methods (e.g., a user authentication).

Control commands can for example also be understood to mean command sequences or else transactions from a database or a database system which are intended to be executed by devices or nodes of the distributed database system. The database system can for example be the distributed database system if there are e.g., transactions to which execution requirements have not yet been allocated or assigned. Alternatively or additionally, the database system can be some other database, e.g., a conventional hierarchical database from which the corresponding transactions can be retrieved. Control commands can for example also be understood to mean command sequences or else transactions which are provided by an input system and which are intended to be executed by the distributed database system or the network application. Control commands can for example be understood to mean command sequences or control commands which are used to control mechanical and/or electrical and/or electromechanical and/or electronic devices.

In association with embodiments of the invention, "device requirements" can be understood to mean for example properties which have to be complied with by a device for an execution of the control transaction or the control commands. By means of the device requirements, there may be a specific predefined device, for example, which is intended to execute e.g., the control commands or the control transaction. In other words, predefinitions that have to be fulfilled by a device which is intended to execute the control commands are defined by the device requirements, for example. In this case, the device requirements are checked e.g., on the basis of device properties of a corresponding device. The device requirements define, e.g., by means of a unique identifier, which devices can or are intended to carry out the predefined control actions (e.g., a manufacturing robot that can weld metal parts; a painting robot that can apply predefined paints to a manufacturing part; devices which produce electrical connections in an automated manner in a transformer substation). It is also possible to predefine e.g., a device which executes the manufacturing steps or control commands with a predefined precision and/or speed (e.g., lathes, milling machines and cutting machines). Alternatively or additionally, "device requirements" can also presuppose specific device classes which are predefined for execution or processing of the control commands. In particular, in this case, a device class is understood to mean one or a plurality of devices (e.g., grinding devices or sawing devices) which are able for example to perform specific predefined actions (e.g., to grind or saw a specific material).

In particular, the device requirements (which can also be referred to as device-specific requirements) are the requirements made of the corresponding devices and/or nodes for the purpose of executing the control commands. The device properties (which can also be referred to as device-specific data) then correspond for example to the actual and/or current device properties of a device. By way of example, a check is made to establish whether a device or a manufacturing machine is able to execute the control commands with the predefined precision which are predefined e.g., in the device-specific requirements. In particular, device-specific requirements can also be referred to as mechanical and/or mechatronic and/or manufacturing-specific requirements. In particular, device-specific data or device properties can also be referred to as mechanical and/or mechatronic and/or manufacturing-specific data or device properties. In particular, device-specific data or device properties can also be referred to as device information. In particular, the device requirements predefine the requirements which are intended to be satisfied by the device-specific data of a device. In other words, the device requirements predefine a "target" value, which is compared with the actual value on the part of the devices. In this case, the device-specific data constitute in particular the current device properties. These device properties or device-specific data comprise for example the UID of a device or of a system, available tools or supported manufacturing methods (milling, grinding or 3D printing), manufacturing precision, manufacturing costs, location of the devices, network address for addressing/driving the device, authorized users etc.

The device requirements can for example also be or comprise security requirements or location-related requirements (e.g., a country indication, a GPS indication or postal code (ZIP code)) which are intended to be satisfied by a device for the execution of the control commands. By way of example, it may be demanded that the device ought to have predefined security facilities or that a specific or a predefined authentication also be required for the execution of the control commands at the device. This may be the case, for example, if someone would like to withdraw cash at a device (e.g., an automatic teller machine). The control commands are then for example the customer-requirement to effect a cash withdrawal. By way of example, if a corresponding customer has configured the fact that this customer allows a cash withdrawal e.g., only in predefined countries, e.g., Italy, France and Austria, then this is stored in the device-specific requirements (and in particular optionally likewise implicitly in the execution requirements). An automatic teller machine in Andorra, if appropriate, would then not allow a withdrawal or would prevent it. Alternatively, this can e.g., also be prevented by a different node of the distributed database system or be prevented by a smart contract of the distributed database system. Moreover, a specific authentication of the customer may be demanded by the security requirements, for example. By way of example, a PIN is entered for a withdrawal (which is not necessarily the case e.g., in the USA) and/or a specific PIN length is demanded (e.g., eight characters) and/or other additional authentication procedures are demanded (e.g., two-factor authentication, mobile TAN, Google Authenticator).

Alternatively, the determining module can also analyze the control commands further and, if for example the determining module already ascertains that the device requirements are not satisfied or are not able to be satisfied, can create a control transaction which points this out to the corresponding device or the system or the network application and, if appropriate, prevents an execution of the control commands. Alternatively, for example, it is also possible not to generate a control transaction and sometime there is a timeout for the execution of the control commands, e.g., after a predefined time period, which is configurable.

In association with embodiments of the invention, "system-specific data" or "device-specific data" or "device properties" can for example also be understood to mean system properties or device properties of a device or of a technical system. The device-specific data or system-specific data or device properties are for example current device properties or system properties. The device-specific data or system-specific data (or the corresponding properties) can comprise the following data for example for a technical system, the devices of a technical system or a device: the UID of the device or of the system, available tools or supported manufacturing methods (milling, grinding or 3D printing) of the device or of the system, manufacturing precision of the device or of the system, manufacturing costs of the device or of the system, location of the device or of the system, network address for addressing/driving the device or the system, authorized users for the device or the system, name of the device or of the system, etc.

Depending on the chosen implementation, for example, the system-specific data can be realized overall for one device or a plurality of devices of a technical system, by virtue of the fact that e.g., by means of a UID/(network) address of the technical system, it is also possible to address, identify or communicate with the corresponding devices of the technical system. Alternatively or additionally, for example the device-specific data for said one device or the plurality of devices of the technical system can be included in the system-specific data.

In association with embodiments of the invention, a "technical system" can for example be understood to mean one device or a plurality of devices which are communicatively connected to one another and/or to a distributed database system (e.g., the first distributed database system) and/or to the network application.

In association with embodiments of the invention, "presupposed control commands" can for example be understood to mean control commands which already have to be executed in particular by other nodes (of the distributed database system) and/or by one or more of the devices before the corresponding control commands can be executed. In particular, for these pre-executed control commands corresponding execution confirmation messages are stored in the distributed database system or the network application (e.g., in data blocks of the distributed database system) if e.g., the pre-executed control commands were successfully executed by devices or nodes. In particular, in the case of these pre-executed or presupposed control commands, the device requirements assigned to these pre-executed control commands are also concomitantly checked or concomitantly taken into account. By means of the execution requirements, it is ensured in particular that for example an order of the manufacturing steps when creating a product is complied with. What is thus achieved, for example, is that the manufacturing order is complied with in an expedient manner. This prevents e.g., one manufacturing step from being ruined by another merely because the manufacturing order was not complied with. In a similar manner, in particular it is also possible to control a controller of a power supply system by e.g., transformers or voltage couplers being switched on or connected to the power supply system in the correct order. If no presupposed control commands are required for the execution of control commands or control transactions, for example, the presupposed control commands can be blank. By way of example, the latter can be occupied by a zero, or occupied by an empty string or a value indicating that no presupposed control commands are necessary. Alternatively, it is possible for example for no execution requirement to be assigned to a portion of the control commands, wherein in particular at least one execution requirement is assigned to at least one of the control commands. By way of example, the presupposed control commands are control commands which e.g., were converted into a predefined mechanical movement and/or other physical variables (e.g., pressure or temperature) by a device and/or node or are intended to be converted before the processing of the control commands (e.g., for preparation of a workpiece). With the presupposed control commands (provided that the latter were executed successfully), for example, the actuators of the devices and/or of the nodes were then driven in such a way that a workpiece was brought to the state or manufacturing state where e.g., further processing is possible or is made possible after the processing of the presupposed control commands. Accordingly, e.g., the corresponding devices/nodes can then be driven with the control commands of the control transaction in such a way that the further processing is effected (when e.g., the presupposed control commands were executed and in particular execution confirmation messages are present for them). By means of the presupposed control commands and the devices and/or nodes, a control loop can for example also be controlled by closed-loop and/or open-loop control, for example by the execution confirmation messages for executed/presupposed control commands being evaluated by the apparatus or by the network application and corresponding control commands being generated as a reaction to the execution confirmation messages. The presupposed control commands can for example also be control commands used to drive a cryptographic device and/or method (e.g., a user authentication). Alternatively or additionally, for example a detection of specific measurement variables (e.g., by a sensor) can be predefined by the presupposed control commands. By way of example, it is thus predefined that corresponding transactions with corresponding measurement values are intended to comply with predefined measurement value ranges or threshold values. The measurement values can be for example a value of a measured variable (e.g., 30° C.) and/or date/time of day of the detection and/or location of the detection and/or sensor type and/or further information about the sensor (e.g., measurement accuracy).

In association with embodiments of the invention, a "separate and/or direct communication channel" can for example be understood to mean data transfer (e.g., transmitting, receiving, transferring, providing or communicating) by means of a communication channel such as is realized for example by the Lightning Network initially only for the transfer of cryptocurrency [9]. By way of example, via this channel, it is possible to send transactions/messages more rapidly and to store a confirmation about this data exchange in the distributed database system or the network application. Thus, for example, important and/or time-critical control commands or control transactions can be transferred at higher speed to a corresponding device and e.g., the slower data transfer of the distributed database system (e.g., in the case of the replication of the data blocks/transactions) or of the network application can be avoided in the process. By way of example, for embodiments of the invention and the stated aspects, exemplary embodiments, embodiments of the invention and their variants, a separate and/or direct communication channel can be established for a data transfer between a device (and/or node). By way of example, in the case of a direct communication channel, the transactions/messages are exchanged directly between a transmitter (e.g., the providing module and/or the determining module) and a receiver (e.g., the device that is intended to execute the control commands), without further nodes and/or devices of the distributed database system or of the network application being involved in this data exchange. By contrast, in the case of a separate communication channel, nodes and/or devices of the distributed database system or of the network application can be involved in the data exchange. If the separate and/or direct communication channel was successfully established between the transmitter and the receiver (that is to say that in particular a communication connection was established as a result), then data for example in the form of transactions or messages can be exchanged between the transmitter and the receiver. By way of example, the necessary data for ascertaining the executability and/or the control transactions can be exchanged between the transmitter and the receiver. If for example the communication channel is closed/ended (that is to say that in particular a communication connection is ended), then for example a result of the data transfer e.g., in the form of transactions (e.g., as a transfer confirmation transaction) is stored in the distributed database system (e.g., in data blocks of the distributed database system) or is stored in the network application. The result of the data transfer can be for example a confirmation of the transfer or of the reception of the corresponding transactions/messages and/or an analysis result and/or the last transferred transaction/message that was transferred via the separate and/or direct communication channel before the communication channel was closed. The storage of the transaction with the result can be effected by the transmitter and/or receiver, for example. The analysis result can be for example the confirmation of the executability of the control commands by a device, wherein for example a corresponding device has confirmed that it can execute the control commands. This can for example in turn be stored in a transaction (e.g., in an executability confirmation transaction or in a confirmation message) and be stored e.g., in the execution requirements (e.g., in the device-specific requirements). Alternatively or additionally, an executability confirmation transaction is stored in the distributed database system or the network application. In this case, the executability confirmation transaction comprises for example a unique identifier for the device that is able to execute the control commands or satisfies the corresponding execution requirements. Alternatively or additionally, the executability confirmation transaction comprises for example data regarding the execution, e.g., how well or to what degree the execution requirements are satisfied (e.g., how rapidly the control commands are processed, when the latter are securely processed, how accurately or precisely the control commands are executed—for example when executing manufacturing control commands). Alternatively or additionally, the executability confirmation transaction comprises for example device-specific data of the corresponding device which are relevant to the execution of the control commands, wherein e.g., the device-specific data were ascertained by the corresponding device at the time of the confirmation of the executability by the device. In this case, e.g., the confirmation of the executability and the ascertainment of the device-specific data are effected (approximately) at the same time—for example within a time window of a few seconds or minutes. By way of example, the data of the executability confirmation transaction may also have been exchanged between the transmitter and the receiver before the executability confirmation transaction is stored e.g., in the distributed database system or the network application. The executability confirmation transaction can for example also be cryptographically protected (e.g., it can be encrypted or be protected by a transaction checksum). Moreover, for example the control transactions can be transferred in an analogous manner to the corresponding device which is intended to or can execute the control commands. For this purpose, for example, a further separate and/or direct communication channel can be established between the transmitter and the receiver. Alternatively, the communication channel mentioned above can continue to be used, for example. Via the corresponding communication channel, for example the corresponding control transactions are then transferred to the corresponding device. If for example the communication channel is closed/ended again if the transfer has been concluded (successfully), the result of the transfer e.g., as a transfer confirmation transaction is stored in the distributed database system or the network application. Moreover, for example, the last message exchanged via the communication channel can be stored in the transfer confirmation transaction (e.g., if the communication channel is interrupted) and the transfer confirmation transaction can e.g., then be stored in the distributed database system or in the network application. Said last message exchanged can be used for example to continue the data exchange or the data transfer in the event of renewed establishment of the communication channel. The transfer confirmation transaction can for example also be cryptographically protected. The transfer confirmation transaction can comprise for example the control commands and/or the control transaction and/or the last message exchanged between the transmitter and the receiver. A continuation of the data exchange or of the data transfer can for example also be used for other data transfers and is not specifically restricted to the data transfer or the data exchange of control transactions.

The separate and/or direct communication channel is advantageous to the effect of improving a transfer speed and/or transfer latency. A hybrid method is also possible, for example, where for example a corresponding communication channel is used for time-critical control commands (e.g., with high priority). By way of example, on the basis of the execution requirements (e.g., there are time-critical control commands or control commands for a real-time application) it is possible to determine whether the control commands are corresponding control commands which are intended to be transferred via a corresponding separate communication channel. Alternatively or additionally, the determining module, for example, when determining the execution requirements, can determine corresponding transfer requirements for a data transfer of the control transactions. The transfer requirements can be stored in the execution requirements, for example. On the basis of the transfer requirements, for example the providing module can then ascertain whether the control transactions are stored in the distributed database system or the network application by way of a transfer to the corresponding device or whether the separate and/or direct communication channel is used for a data transfer to the corresponding device. The data transfer can then be effected by the providing module of the apparatus, for example, said providing module comprising for this purpose e.g., a corresponding communication module (e.g., a network interface).

Embodiments of the invention are advantageous to the effect of using for example a blockchain, a network application or a distributed database system e.g., as an industrial communication infrastructure and/or control platform e.g., in the manufacturing sector. It is thereby possible to realize in particular a manufacturing infrastructure in which devices (e.g., autonomous devices) of different operators in a trustless environment require a trust basis in order to process a manufacturing job (Trust in a trustless environment). In this case, for example temporal requirements can be predefined e.g., by the configurability and the selectability of the validation and/or transfer. The distributed database system validates e.g., only those transactions which can be executed by a corresponding blockchain-based manufacturing system or the corresponding devices, by virtue of e.g., a predefined number of nodes confirming that they execute these transactions.

By way of example, it is also possible for the predefined number of nodes to be at least partly or completely nodes of a shard (e.g., of an ethereum shard). Alternatively, it is also possible for the predefined number of nodes to be at least partly nodes of different shards. The respective shards of a network application (e.g., of a distributed database system such as a blockchain) can be formed specifically for nodes in the form of devices, by virtue of e.g., the nodes of a shard being formed by the device properties (e.g., manufacturing device, test device, secure device or device with high reliability or manufacturing precision).

Embodiments of the invention are suitable in particular for IoT applications of the blockchain where e.g., at least one device is intended to execute any control action, the execution being subject to certain execution requirements.

By means of embodiments of the invention, conventional blockchains can be improved e.g., to the effect of improving the executability of transactions or preventing non-executable transactions from being stored in the blockchain. This is particularly if the control transactions or the control commands encode or comprise a smart contract, since there is e.g., a need for storing executable smart contracts in a blockchain.

In a first embodiment of the apparatus, upon being provided, the control transaction or the control transactions is/are validated on the basis of the corresponding confirmation messages. This is advantageous to the effect of ensuring e.g., that a blockchain comprises only validated transactions which can actually be executed. In further embodiments of the apparatus, the confirmation module is configured to select the transaction and/or the control commands on the basis of the confirmation messages and to provide it/them as selected control transaction or as a plurality of selected control transactions.

In further embodiments of the apparatus, the confirmation module is configured to mark the transaction and/or the control commands on the basis of the confirmation messages and to provide it/them as marked control transaction or as a plurality of marked control transactions.

In further embodiments of the apparatus, the request message comprises execution requirements for an execution of the control commands by the device or the devices. Alternatively or additionally, the execution requirements are predefined by the control commands and/or by the transaction and/or by a policy. Alternatively or additionally, the execution requirements predefine device-specific requirements for the device or the devices. Alternatively or additionally, the execution requirements predefine pre-executed control commands for an execution of the control commands by the device or the devices. Alternatively or additionally, the execution requirements comprise a time requirement that predefines a processing time guaranteed by a corresponding device.

As a result, for example, the validation is effected taking account of predefinitions imposed by the execution requirements on an execution of corresponding control commands by devices. For this purpose, for example, the execution requirements with the request message can be communicated to corresponding devices which satisfy at least some of the execution requirements which e.g., are already checkable by the determining module. In the confirmation messages, e.g., a device confirms that it can execute at least some of the control commands if it can execute e.g., the corresponding control commands while complying with the execution requirements assigned to these control commands. In this case, the processing time predefines for example a processing speed for the control commands. Alternatively or additionally, e.g., the processing time can predefine a point in time when the control commands must be processed. Alternatively or additionally e.g., the processing time can predefine a time behavior which must be complied with during the processing of the control commands. The time behavior can e.g., predefine the fact that the control commands are executed under real-time conditions.

The execution requirements can be predefined e.g., at least partly by the transaction or the control commands. Alternatively or additionally, the execution requirements can be calculated e.g., at least partly (e.g., by the determining module). Alternatively or additionally, the execution requirements can be predefined e.g., at least partly by the policy, with the policy for example being predefined by the network application or fixedly configured (e.g., in the Genesis block). Alternatively or additionally, the execution requirements can be calculated e.g., at least partly on the basis of the control commands or the transaction (e.g., by the determining module), wherein for example minimum requirements for an execution of the control commands are calculated for this purpose. Alternatively or additionally, the execution requirements can comprise at least partly a priority regarding the execution of the control commands. Alternatively or additionally, the execution requirements can comprise the demanded processing time. Alternatively or additionally, the execution requirements can comprise the demanded execution costs. Alternatively or additionally, the execution requirements can comprise predefinitions regarding execution costs (e.g., energy consumption or financial costs) during the execution or processing of the control commands. Alternatively or additionally, the execution requirements can predefine a device reliability for a device, in order that e.g., a failure of a device or a defect of a device during the execution or processing of the control commands is unlikely.

It is also possible, for example, for the control commands or the control transaction to be optimized on the basis of a predefined optimization variable by the determining module or by the providing apparatus. In this case, the optimization variable can be the priority of the control commands and/or the execution time and/or the processing time and/or the execution time period and/or the device capacity utilization and/or the device reliability.

In further embodiments of the apparatus, a corresponding confirmation message comprises current device properties of the device which transmitted the corresponding confirmation message, for example.

The current device properties can be communicated for example as device-specific data or as current device state.

In further embodiments of the apparatus, the determining module comprises device properties for the device or at least for one portion of the devices. Alternatively or additionally, the determining module determines, on the basis of the device properties and/or the execution requirements and/or the transaction and/or the control commands, the device or the devices to which the request message is communicated. Alternatively or additionally, the device properties of a corresponding device are updated in the determining module in the event of a change in the device properties.

In further embodiments of the apparatus, a number of confirmation messages is predefined for one control command of the control commands and/or at least one portion of the control commands and/or selected control commands of the control commands. Alternatively or additionally, the predefined number of confirmation messages confirms an execution of the corresponding control commands on a plurality of different devices. The predefined number can be stored e.g., for different control commands in the execution requirements or the execution requirements comprise this information.

In further embodiments of the apparatus, after an execution of corresponding control commands by a corresponding device, an execution confirmation message is stored.

By way of example, the execution confirmation message can comprise an indication regarding whether the control commands were completely executed, whether the control commands were partly executed or whether the control commands were not executed at all. By way of example, the fact of which control commands were executed and which control commands were not executed is stored in the execution confirmation message.

In further embodiments of the apparatus, the apparatus comprises a confirmation module. Alternatively or additionally, the confirmation module is configured to confirm the execution of the control commands and/or control transactions, wherein the confirmation is effected for example on the basis of the execution confirmation message and/or on the basis of the execution requirements.

In further embodiments of the apparatus, the determining module is configured, in the event of the execution requirements not being complied with and/or in the event of an unsuccessful execution of a corresponding control transaction or of corresponding control commands by a corresponding device, to communicate the corresponding control transaction or the corresponding control commands to a further device for execution, said further device having sent a confirmation message e.g., for the corresponding control commands or for the corresponding control transaction.

In further embodiments of the apparatus, the confirmation messages are taken as a basis for determining an order for the processing of the control transactions by the determining module.

In further embodiments of the apparatus, the device and/or the devices and/or the apparatus are/is realized in each case as one node or as a plurality of nodes of a network application realized e.g., by means of a distributed database system, such as e.g., a blockchain. The transaction received by the first receiving module can be for example an unvalidated transaction which is intended to be stored e.g., by the apparatus as a validated transaction (e.g., as a control transaction) in the network application or by the network application. The request message and/or the confirmation message and/or the execution confirmation message can be for example in each case a transaction of the network application or for example messages that are transferred via a separate communication channel between the apparatus (e.g., a node of a blockchain) and one of the corresponding devices (e.g., a node of a blockchain).

In accordance with a further aspect, embodiments of the invention relates to a device comprising:
- a first receiving module, wherein the first receiving module is configured to receive a request message for execution of control commands;
- a checking module, wherein the checking module is configured to ascertain a check result regarding the executability of the control commands by the device;
- a transmitting module, wherein the transmitting module is configured to transmit a confirmation message for the executability of the control commands by the device on the basis of the check result.

In accordance with a further aspect, embodiments of the invention relates to a device comprising:
- a first receiving module, wherein the first receiving module is configured to receive a request message for execution of control commands;
- a checking module, wherein the checking module is configured to ascertain a check result regarding the executability of the control commands by the device;
- a transmitting module, wherein the transmitting module is configured to transmit a confirmation message for the executability of the control commands by the device on the basis of the check result;
- a second receiving module, wherein the second receiving module is configured to receive the control commands and/or a control transaction with the control commands;
- an execution module, wherein
  the execution module is configured to execute the control commands and/or the control transaction.

The execution module can for example additionally be configured to provide an execution confirmation message regarding the execution of the control commands. For this purpose, the execution confirmation message can e.g., be transferred to the apparatus and/or be stored by the network application.

In further embodiments of the device, the first receiving module additionally receives execution requirements for the corresponding control commands.

In further embodiments of the device, the executability of the control commands is ascertained on the basis of device properties of the device and/or on the basis of the execution requirements for the corresponding control commands and is stored in the check result, for example. For this purpose, the device comprises a configuration memory comprising the device properties, wherein the device properties are updated for example for the device and/or by the device if the device properties change. By way of example, the device properties or the updated device properties are provided to the apparatus or transferred to the apparatus. This can be effected for example after an update of the device properties. By way of example, for determining the executability, the device properties of the device are compared with device requirements of the execution requirements for an execution of the control commands by the device. By way of example, if the device properties of the device comply with the device requirements, the executability is confirmed in the check result, for example. The confirmation message then comprises a confirmation regarding the executability of the control commands by the device. Said confirmation message is communicated to the apparatus e.g., by way of a network application realized e.g., by means of a distributed database system, such as a blockchain.

In further embodiments of the device, the confirmation message comprises an execution time period or an execution instant, specifying e.g., when the control commands are executed by the device or when the control commands are processed by the device.

In further embodiments of the device, the device and/or the apparatus are/is realized in each case as one node or a plurality of nodes of a network application realized e.g., by means of a distributed database system, such as a blockchain. The request message and/or the confirmation message and/or the execution confirmation message can be for example transactions of the network application or can be for example messages that are transferred via a separate communication channel between the apparatus (e.g., a node of a blockchain) and the device (e.g., a node of a blockchain).

In accordance with a further aspect, embodiments of the invention relates to a system comprising an apparatus according to embodiments of the invention or one of the embodiments of the apparatus and comprising one device according to embodiments of the invention or a plurality of devices according to embodiments of the invention or embodiments of these devices.

In further embodiments of the system, of the apparatus or of the device, the device and/or the devices and/or the apparatus are/is in each case one node or a plurality of nodes of a network application. Alternatively or additionally, the network application is a distributed database system such as a blockchain. Alternatively or additionally, the transaction received by the first receiving module is an unvalidated transaction. Alternatively or additionally, the request message and/or the confirmation message and/or the execution confirmation message are/is in each case a transaction of the network application and/or messages that are transferred via a separate communication channel between the apparatus and one of the corresponding devices.

In accordance with a further aspect, embodiments of the invention relate to a computer-implemented method for providing a control transaction comprising the following method steps:
  receiving a transaction, wherein
    the transaction comprises control commands;
  determining one device or a plurality of devices which in each case wholly or partly execute the control commands;
  communicating a request message for execution of the corresponding control commands to the device or the plurality of devices;
  receiving confirmation messages, wherein
    the confirmation messages are responses of the device or of the plurality of devices to the request message;
  providing the transaction and/or the control commands as control transaction or as a plurality of control transactions on the basis of the confirmation messages.

In further embodiments of the method, the method comprises further method steps or features of the apparatus in order to realize e.g., the functional features of the apparatus or of the embodiments of the apparatus as a method.

In accordance with a further aspect, embodiments of the invention relate to a computer-implemented method for executing a control transaction by means of a device comprising the following method steps:
  receiving a request message for execution of control commands by a device;
  ascertaining a check result regarding an executability of the control commands by the device;
  transmitting a confirmation message for the executability of the control commands by the device on the basis of the check result;
  receiving the control commands and/or a control transaction with the control commands;
  executing the control commands and/or the control transaction.

In further embodiments of the method, the method comprises further method steps or features of the device in order to realize e.g., the functional features of the device or of the embodiments of the device as a method.

In accordance with a further aspect, embodiments of the invention relate to a computer-implemented method for executing a control transaction by means of a device comprising the following method steps:
  receiving a request message for execution of control commands by a device;
  ascertaining a check result regarding an executability of the control commands by the device;
  transmitting a confirmation message for the executability of the control commands by the device on the basis of the check result.

In further embodiments of the method, the method comprises further method steps or features of the device in order to realize e.g., the functional features of the device or of the embodiments of the device as a method. Furthermore, a computer program product (non-transitory computer readable storage medium having instructions, which when executed by a processor, perform actions), wherein in each case one of the methods according to embodiments of the invention, all of the methods according to embodiments of the invention or a combination of the methods according to embodiments of the invention can be carried out by means of the computer program product.

In addition, a variant of the computer program product comprising program instructions for the configuration of a creating device, for example a 3D printer, a computer system or a production machine suitable for creating processors and/or devices, wherein the creating device is configured with the program instructions in such a way that the stated device according to embodiments of the invention or the apparatus according to embodiments of the invention is created.

Furthermore, a providing apparatus for storing and/or providing the computer program product is provided. The providing apparatus is a data carrier, for example, which stores and/or provides the computer program product. Alternatively and/or additionally, the providing apparatus is for example a network service, a computer system, a server system, in particular a distributed computer system, a cloud-based computer system and/or virtual computer system which stores and/or provides the computer program product in the form of a data stream.

This providing is effected for example as a download in the form of a program data block and/or instruction data block as a file, in particular as a download file, or as a data stream, in particular as a download data stream, of the complete computer program product. However, this providing can also be effected as a partial download, for example, which consists of a plurality of parts and in particular is downloaded via a peer-to-peer network or is provided as a data stream. Such a computer program product is read into a system for example using the providing apparatus in the form of the data carrier and executes the program instructions, such that the method according to embodiments of the invention is caused to be executed on a computer or configures the creating device in such a way that it creates the device according to embodiments of the invention or the apparatus according to embodiments of the invention.

BRIEF DESCRIPTION

Some of the embodiments will be described in detail, with reference to the following figures, wherein like designations denote like members, wherein.

In the figures, functionally identical elements are provided with the same reference signs, unless indicated otherwise.

DETAILED DESCRIPTION

The exemplary embodiments below, unless indicated otherwise or already indicated otherwise, comprise at least one processor and/or a storage unit in order to implement or execute the method.

Moreover, in particular a (relevant) person skilled in the art with knowledge of the method claim/method claims is of course aware of all routine possibilities in the prior art for realizing products or implementation possibilities, and so in particular independent disclosure in the description is not needed. In particular, these customary realization variants known to the person skilled in the art can be realized exclusively by hardware (components) or exclusively by software (components). Alternatively and/or additionally, the person skilled in the art, within the scope of his/her expert ability, can to the greatest possible extent choose any desired combinations according to the invention of hardware (components) and software (components) in order to implement realization variants according to the invention.

A combination according to embodiments of the invention of hardware (components) and software (components) may occur particularly if one portion of the effects according to embodiments of the invention is brought about exclusively by means of special hardware (e.g., a processor in the form of an ASIC or FPGA) and/or another portion is brought about by means of the (processor- and/or storage-aided) software.

In particular, in view of the high number of different realization possibilities, it is impossible, nor is it helpful or necessary for the understanding of embodiments of the invention, to mention all these realization possibilities. In this respect, in particular all the exemplary embodiments below are intended to demonstrate merely by way of example some ways of showing how in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can also serve as features for another exemplary embodiment, in particular without this needing to be explicated in the respective exemplary embodiment.

Figure 1:
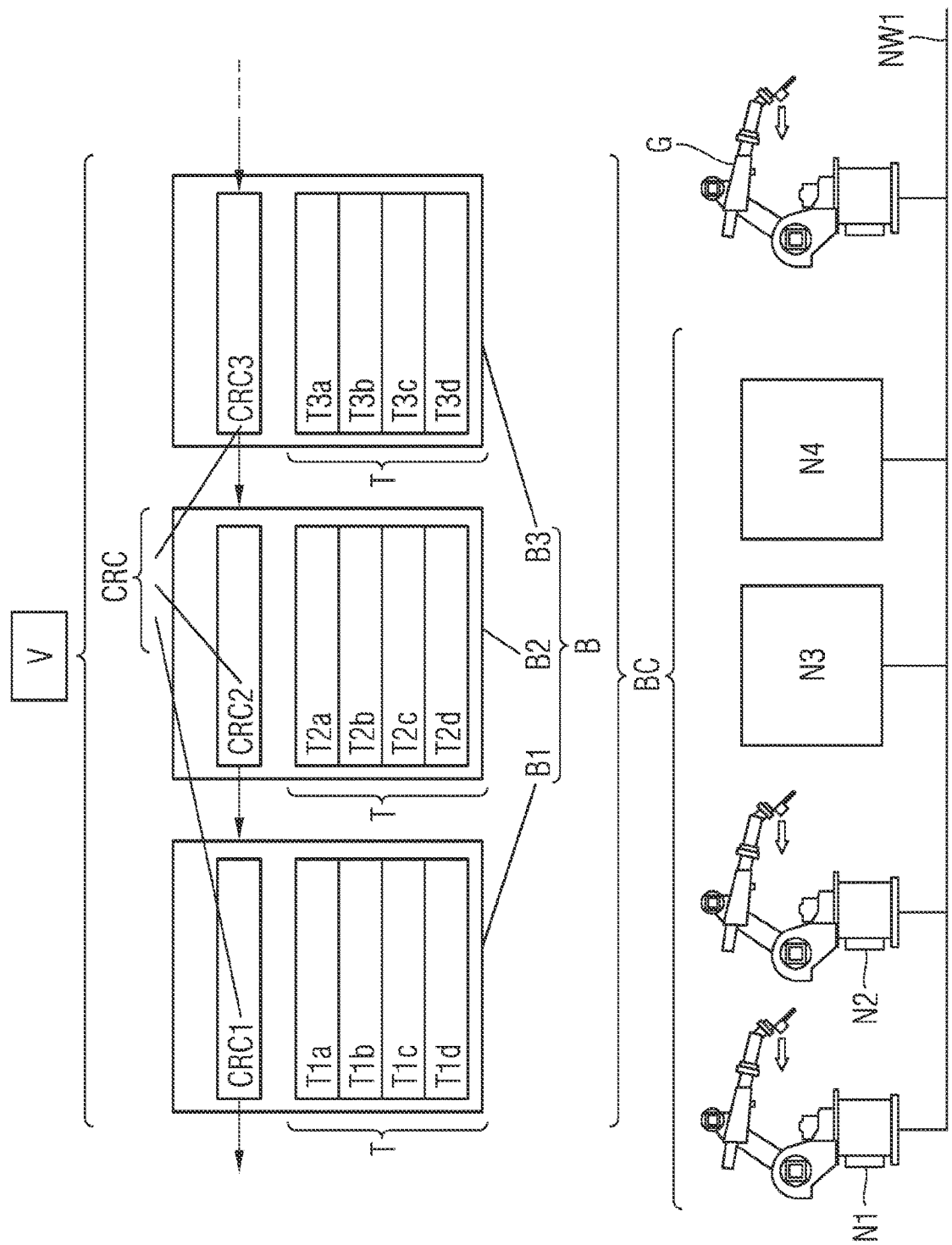
FIG. 1 shows a first exemplary embodiment of the invention.

FIG. 1 shows a cyberphysical system comprising a network application and the infrastructure thereof.

The system shown in FIG. 1 can comprise for example a network application in the form of a blockchain or a distributed database system, wherein the distributed database system is realized e.g., by means of a blockchain BC.

FIG. 1 shows a first node N1 (e.g., a first device such as a manufacturing robot), a second node N2 (e.g., a second device such as a manufacturing robot), a third node N3 (e.g., a third device) and a fourth node N4 (e.g., a fourth device), which form by way of example the nodes of the blockchain BC of the distributed database system, wherein one of the nodes, e.g., the first node N1, is the device that is intended to be controlled by means of the transaction. In this case, the nodes are connected to one another e.g., via a first communication network NW1. The distributed database system can additionally also comprise a multiplicity of further nodes. In other words, FIG. 1 shows a multiplicity of devices (the nodes N1-N4 and an external device) which are communicatively connected by means of the network application in the form of a distributed database system.

In addition, the distributed database system comprises an apparatus V. The apparatus V comprises a first receiving module, a determining module, a second receiving module and a providing module, which are communicatively connected to one another e.g., via a bus.

The first receiving module is configured for receiving a transaction, wherein the transaction comprises control commands. In this case, the control commands are intended to be executed by e.g., the first device (e.g., the first node N1) or a plurality of further devices (e.g., by the second node N2 and/or by the third node N3 and/or by the fourth node N4 and/or by the external device G).

The determining module is configured to determine one device from the multiplicity of devices or a plurality of devices from the multiplicity of devices which in each case wholly or partly execute the control commands. The determining module is additionally configured to communicate to the device or the plurality of devices a request message for execution of the corresponding control commands. The request message can additionally also comprise execution requirements for an execution of the control commands by corresponding devices and/or the control commands to be executed. By way of example, the execution requirements can be received by the first receiving module for the corresponding control commands or the execution requirements are stored in the transaction, for example, or the execution requirements were predefined by a policy or the execution requirements were calculated by the determining module for the respective control commands.

The execution requirements are for example at least partly received by the first receiving module for the corresponding control commands and/or the execution requirements are for example at least partly stored in the transaction and/or the execution requirements were at least partly predefined by a policy or the execution requirements were at least partly calculated by the determining module for the respective control commands. This is advantageous in order that execution requirements are dynamically configured in an automated manner during a manufacturing process. Execution requirements initially kept general, for example, can be predefined by the transactions (e.g., a manufacturing duration for a workpiece 4 is not more than four hours). The determining module then determines, on the basis of device properties of the multiplicity of devices, specific device requirements (e.g., UID of the device) in order to execute e.g., specific individual control commands by means of selected devices.

In further variants, the execution requirements can be predefined e.g., at least partly by the transaction or the control commands. Alternatively or additionally, the execution requirements can be calculated e.g., at least partly (e.g., by the determining module). Alternatively or additionally, the execution requirements can be predefined e.g., at least partly by the policy, with the policy for example being predefined by the network application or fixedly configured (e.g., in the Genesis block). Alternatively or additionally, the execution requirements can be calculated e.g., at least partly on the basis of the control commands or the transaction (e.g., by the determining module), wherein for example minimum requirements for an execution of the control commands are calculated for this purpose. Alternatively or additionally, the execution requirements can comprise at least partly a priority regarding the execution of the control commands. Alternatively or additionally, the execution requirements can comprise the demanded processing time. Alternatively or additionally, the execution requirements can comprise the demanded execution costs. Alternatively or additionally, the execution requirements can comprise predefinitions regarding execution costs (e.g., energy consumption or financial costs) during the execution or processing of the control commands. Alternatively or additionally, the execution requirements can predefine a device reliability for a device, in order that e.g., a failure of a device or a defect of a device during the execution or processing of the control commands is unlikely.

By means of the priority, e.g., the execution or processing of the corresponding control commands can be controlled (e.g., by prioritization of corresponding control commands).

A device confirms in a corresponding confirmation message, for example, that it can execute the corresponding control commands or control transaction whilst complying with the priority.

In other words, the device confirms that it executes the corresponding control commands whilst complying with the priority of the associated execution requirements. By way of example, control transactions or control commands are executed with a high priority. By way of example, a device can alternatively confirm that it can process prioritized control commands or can optionally take account of the priority in the control commands. Such a priority can e.g., also relate to the fact that the processing of control commands or control transactions by a device can optionally be interrupted by control commands or control transactions having higher priority. This type of requirement in respect of the processing capability (stored e.g., in the device properties) can also be stored in the execution requirements (e.g., device requirements).

In the stated example, "preferably" means, in particular, that the corresponding control commands are processed more rapidly or before other non-preferred control commands (e.g., control commands having a low priority) (e.g., by the devices or the distributed database system). These control commands which are to be preferred, or preferred control commands for short, can be for example important/critical control commands which must be executed immediately in order to avoid damage to devices, damage to infrastructure or injuries to persons, for example. If for example a monitoring device, which in particular is likewise a node of the distributed database system, establishes that the corresponding device, e.g., a manufacturing device, is overheating or a person is dangerously close to the device, then said monitoring device can for example set or store a corresponding control transaction with control commands and execution requirements (e.g., the execution requirements comprise the priority) for switching off the device in the distributed database system. The distributed database system or the infrastructure thereof evaluates said control transaction and preferably communicates the control transaction to the device to be switched off.

Thus, a priority can also be assigned to a control transaction or corresponding control commands by means of the execution requirements. This priority is preferably higher than a priority of the rest of the control commands. With this increased priority the corresponding control instruction of a control transaction is preferably processed by the corresponding device in order for example to invalidate (declare to be invalid) the remaining control commands of the command sequence or to prevent the execution thereof.

By way of example, scheduling for the control transactions can be effected on the basis of the execution requirements, e.g., taking account of the priority. Alternatively, or additionally, an optimization variable and/or a cost function can be taken into account for the scheduling of the control transaction(s), in order e.g., by means of the scheduling to realize a decentralized execution prioritization of the control transactions by corresponding devices. On the basis of the confirmation messages of the devices for different control commands, the corresponding control commands, taking account of the optimization variable and/or a cost function, are firstly sorted and selected e.g., for storage in control transactions. By way of example, the sorting predefines an order of the control commands in a corresponding control transaction in order to accelerate the processing by a corresponding device. Accordingly, control commands which can be executed by an individual device or a group of devices can be stored in a control transaction, for example. The order or sorting of the control commands in a corresponding control transaction controls for example the order of processing of the control commands by the devices or the group of devices.

Alternatively or additionally, the priority or the execution requirements of the corresponding control commands can comprise a value indicating the urgency of an execution of corresponding control commands. Here for example one device or a group of devices (also called device group) can confirm in corresponding confirmation messages that this urgency value can be processed for the priority.

Thus, e.g., the devices can confirm that optionally a prioritization, reprioritization, etc. in the processing or execution of the control commands is performed independently by the devices and is effected e.g., by way of a predefined communication platform (e.g., likewise predefined in the execution requirements). The communication platform can be e.g., the network application or a separate distributed database system or a blockchain.

Alternatively or additionally, the determining module and/or the providing module can take account of the urgency value when storing the control commands in control transactions. This involves stipulating, on the basis of the confirmation messages and/or taking account of the urgency value, the device by which and/or the point in time at which the control commands of corresponding control transactions are executed. The control commands that are stored in a control transaction are selected in such a way that they take account of the data of the confirmation messages and/or the urgency value. In other words, the content (i.e. which control commands are stored in the control transaction) of a control transaction is determined e.g., on the basis of the confirmation messages and/or the urgency value and/or the priority.

By way of example, an order of control transactions in a data block can be determined on the basis of the confirmation messages and/or the urgency value and/or the priority and/or the execution requirements of the corresponding control transactions. That, too, can be defined for example by the determining module or by the providing module.

As a result, e.g., different types of control transactions can be realized. They are for example control transactions which are processed e.g., in a predefined time window (e.g., in the next block or validation cycle). Moreover, they can be for example control transactions whose executability is confirmed (e.g., validated transactions for scheduling), but whose execution time is still indefinite and/or the execution time is unimportant. All that is important is that they can be executed, if appropriate.

By way of example, the determining module can comprise a device memory, in which are stored the device properties for each of the individual devices of the multiplicity of devices. In this case, the device properties comprise e.g., the communication address of the device, the location of the device, tools of the device, safety devices of the device, cryptographic devices of the device, etc.

The determining module can determine on the basis of the device properties and/or the execution requirements and/or the transaction and/or the control commands, for example, the device or devices to which the request message is communicated.

The second receiving module is configured for receiving confirmation messages, wherein the confirmation messages are responses of the device or of the plurality of devices to the request message.

In one variant of the apparatus, a corresponding confirmation message comprises current device properties of the device which transmitted the corresponding confirmation message, for example. This is advantageous in order for example to give notification of a changed configuration or device properties of the device of the apparatus. In this case, the determining module can for example update the stored device properties in the device memory.

The providing module is configured to provide the transaction and/or the control commands on the basis of the confirmation messages as control transaction or as a plurality of control transactions. By way of example, in this case, the providing module stores the control transaction or the plurality of control transactions as validated control transactions in the network application. By way of example, in the case of a blockchain, these transactions are stored as validated transactions e.g., in a data block of the blockchain.

In one variant of the apparatus, the apparatus comprises a confirmation module. The confirmation module can be configured e.g., to confirm the execution of the control commands and/or control transactions. This can be effected e.g., on the basis of the execution confirmation message and/or on the basis of the execution requirements. By way of example, the execution requirements can predefine a processing time for at least some of the control commands. If e.g., the network application (e.g., the blockchain BC) contains an execution confirmation message in the form of an execution confirmation transaction for these control commands at the predefined time, then the execution of these control commands is confirmed e.g., by the apparatus and a corresponding device can be rewarded e.g., for the execution of the control commands by means of resources (e.g., raw materials, money, crypto-assets, release of storage space, release of a machine location). It is also possible, for example, for the corresponding execution confirmation messages to be generated by a supervisory device (e.g., the third node N3) for an execution of the control commands by a device (e.g., the first node N1). In other words, the device which sends the execution confirmation message and the device which processes or executes the control commands are different from one another.

In one variant, the determining module or the confirmation module is configured, in the event of the execution requirements not being complied with and/or in the event of an unsuccessful execution of a corresponding control transaction or of corresponding control commands by a corresponding device, to communicate the corresponding control transaction or the corresponding control commands to a further device for execution, wherein the further device sent a confirmation message e.g., for the corresponding control commands or for the corresponding control transaction. This is e.g., the case if no execution confirmation messages are present at the processing time predefined e.g., for corresponding control commands by the assigned execution requirements. The processing time in the execution requirements for the corresponding control commands can be chosen for example such that there is still enough time available for the further device to be able to process the control commands. By way of example, the determining module can determine the execution requirements in such a way that if necessary there is still enough time for at least one second device to be able to execute the corresponding control commands or control transactions. In particular, in the case of control transactions being executed, the control commands stored in the control transaction are executed. In other words, if control commands are executed, the control transaction is thus implicitly executed as well.

The apparatus V can for example additionally also comprise an update interface. By means of this interface (e.g., a USB interface or a Firewire interface or some other communication interface), for example firmware of the apparatus can be updated and/or configuration data can be incorporated and/or log data/logging data of the apparatus V can be read out. By means of this interface or a further interface, for example the apparatus V can for example also be remote-controlled for maintenance purposes (e.g., remote maintenance). This may be relevant for example if the apparatus V has to be restarted.

The apparatus V can for example also comprise a timer (e.g., a clock). Said timer can be used e.g., to establish whether the confirmation messages arrived in a timely manner.

The apparatus V can for example additionally also comprise a fan, e.g., for cooling the modules or the components of the apparatus.

The apparatus V can for example additionally also comprise one further component or a plurality of further components, such as for example a processor, a storage unit, further communication interfaces (e.g., Ethernet, WLAN, USB, Fieldbus, PCI), an input device, in particular a computer keyboard or a computer mouse, and a display device (e.g., a monitor). The processor can comprise for example a plurality of further processors which can be used in particular for realizing further exemplary embodiments.

The external device G shown in FIG. 1 is e.g., not embodied as a node of the network application, but can be controlled by the network application by means of the control commands or a control transaction e.g., via a corresponding data interface of the device G. Alternatively, the device G retrieves control commands or a control transaction e.g., from the network application via the data interface.

Furthermore, FIG. 1 shows blocks B, for example a first block B1, a second block B2 and a third block B3, of the blockchain BC, wherein here in particular a segment of the blockchain BC is shown by way of example.

The blocks B each comprise a plurality of transactions T. The first block B1 comprises for example a first transaction T1$a$, a second transaction T1$b$, a third transaction T1$c$ and a fourth transaction T1$d$.

The second block B2 comprises for example a fifth transaction T2$a$, a sixth transaction T2$b$, a seventh transaction T2$c$ and an eighth transaction T2$d$.

The third block B3 comprises for example a ninth transaction T3$a$, a tenth transaction T3$b$, an eleventh transaction T3$c$ and a twelfth transaction T3$d$.

The blocks B each additionally also comprise one of the linking checksums CRC, which is formed depending on the direct predecessor block. Consequently, the first block B1 comprises a first linking checksum CRC1 from its predecessor block, the second block B2 comprises a second linking checksum CRC2 from the first block B1, and the third block B3 comprises a third linking checksum CRC3 from the second block B2.

The respective linking checksum CRC1, CRC2, CRC3 is preferably formed by way of the block header of the corresponding predecessor block. The linking checksums CRC can preferably be formed using a cryptographic hash function such as e.g., SHA-256, KECCAK-256 or SHA-3. By way of example, the linking checksum can additionally be calculated by way of the data block checksum or the header comprises the data block checksum (the data block checksum is explained below).

In addition, each of the blocks can comprise a data block checksum. The latter can be realized by means of a hash tree, for example.

In order to form the hash tree, a transaction checksum (e.g., likewise a hash value) is calculated for each transaction of a data (block). Alternatively or additionally, a transaction checksum that was created by the generator of the transaction preferably during the generation of the transaction can continue to be used for this purpose.

Usually, for a hash tree, a Merkle tree or a Patricia tree is used, for example, the root hash value/root checksum of which is preferably stored as a corresponding data block checksum in the respective blocks.

In one variant, the data block checksum is used as the linking checksum.

A block can furthermore have a time stamp, a digital signature, a proof-of-work verification, as has been explained in the embodiments of the invention.

The blockchain BC itself is realized by a blockchain infrastructure having a plurality of blockchain nodes (nodes N1, N2, N3, N4 and further blocks). The nodes can be for example blockchain oracles or trustworthy nodes.

The nodes and the external device are communicatively connected to one another via the network NW1 (e.g., a communication network such as the Internet or an Ethernet network). By means of the blockchain infrastructure, for example at least one portion of the data blocks B or all of the data blocks B of the blockchain BC is/are replicated for a portion or all of the nodes of the blockchain.

The apparatus V can be realized e.g., by components or component parts of the blockchain (or of the network application or of the distributed database system) by virtue of the blockchain or the network application wholly or partly realizing the modules of the apparatus V. By way of example, the respective modules can be realized in each case by one or a plurality of nodes which were configured specifically for the function. These nodes can be for example processors e.g., in the form of ASICs. The respective modules are preferably realized by a plurality of nodes embodied in an identical way, in order to ensure the functionality of the respective module, e.g., in the event of a failure of a node.

Figure 2:
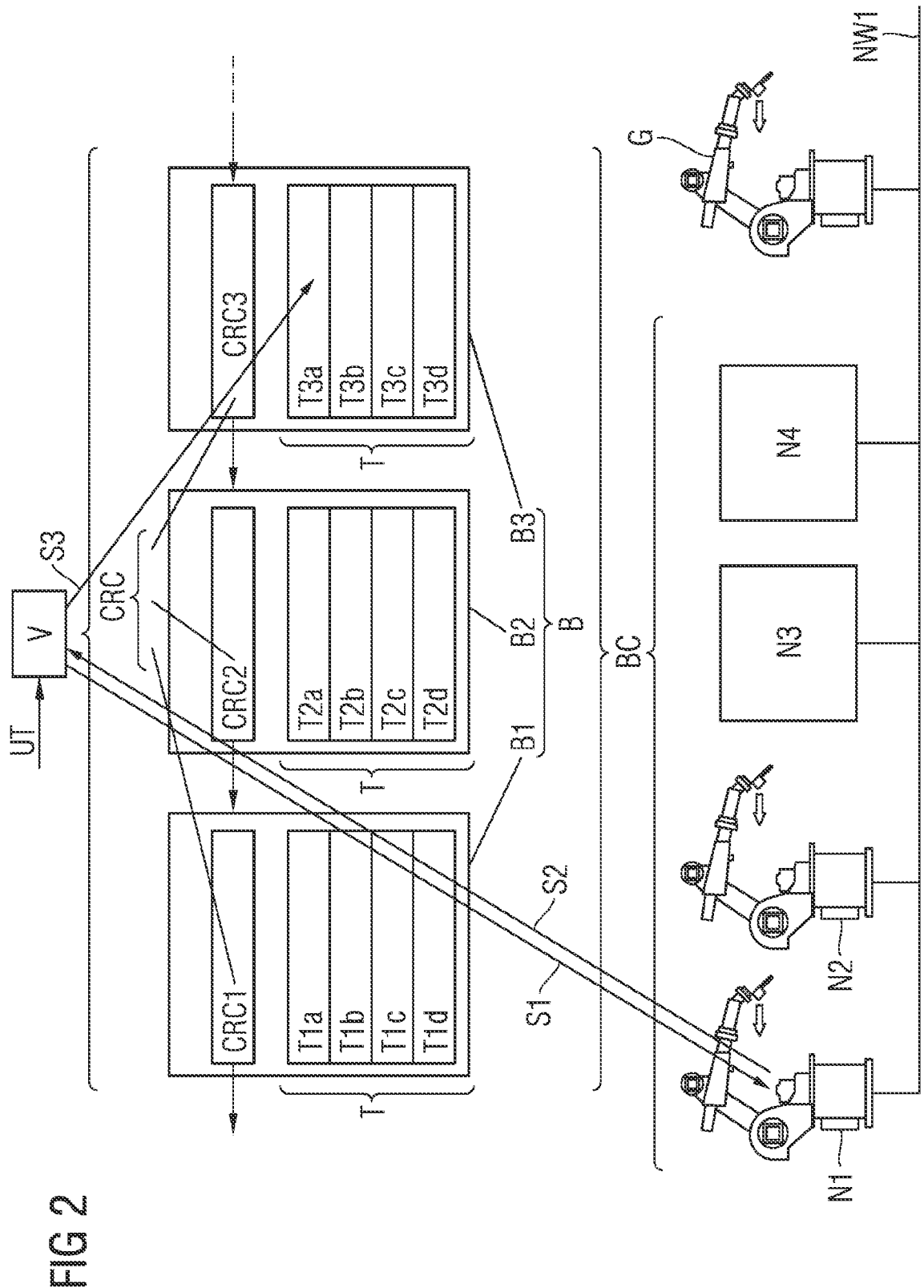
FIG. 2 shows a further exemplary embodiment of the invention.

FIG. 2 shows in association with FIG. 1 for example the sequence of processing a transaction.

The apparatus V receives an (unvalidated) transaction UT comprising control commands, for example. The transaction UT additionally comprises e.g., execution requirements assigned in each case to one of the control commands or a plurality of control commands. It is also possible for different execution requirements in each case to be assigned to the individual control commands of the control commands. If the transaction comprises ten control commands, for example, then individual execution requirements of different types can be assigned e.g., to each of these control commands. Accordingly, by way of example, common execution requirements or in each case different execution requirements can be assigned to individual control commands or a plurality of control commands. This assignment can be carried out for example wholly or partly by the determining module.

The determining module is configured to determine one device or a plurality of devices which in each case wholly or partly execute the control commands. By way of example, the determining module determines, on the basis of the control commands and the execution requirements on the basis of the device properties of the node N1, that the latter can execute the control commands. In one variant, the determining module can also determine firstly the corresponding execution requirements and then the corresponding devices. The determining module then communicates (e.g., by means of a separate and/or direct communication channel) in S1 to the first node N1 a request message for execution of the corresponding control commands. The request message can for example also be communicated to the first node as a transaction (e.g., the transaction T1a) of the network application (e.g., the network application is implemented by means of the blockchain BC). For this purpose, the corresponding request message is stored in a transaction (called request transaction for example) of the blockchain and is provided to the first node N1 or communicated to the node N1 in a data block e.g., by means of the blockchain infrastructure.

In this case, the request message comprises a request with corresponding information (e.g., the execution requirements and/or the control commands and/or indications regarding the necessary resources that are necessary for an execution of the control commands) in order that the node N1 can create a confirmation message with which the node N1 confirms that the control commands are able to be executed and in this case e.g., also complies with the execution requirements of the control commands (S2).

In this case, the necessary resources can be ascertained e.g., by the determining module for the corresponding control commands.

The confirmation message can for example also be communicated to the apparatus V as a transaction (e.g., the transaction T2a) of the network application (e.g., the network application is implemented by means of the blockchain BC). For this purpose, the corresponding confirmation message is stored in a transaction (called confirmation transaction, for example) of the blockchain and is provided to the apparatus V or communicated to the apparatus V in a data block e.g., by means of the blockchain infrastructure.

If the first node N1 confirms with its confirmation message that it can execute the control commands, the corresponding control commands are stored in the transaction T3a, for example, which can also be referred to as a validated control transaction (S3).

The first device or the first node N1 can be configured differently.

By way of example, the device can comprise a first receiving module, a checking module, an optional transmitting module, an optional second receiving module and an execution module, which are communicatively connected to one another via a bus.

The first receiving module is configured to receive a request message for execution of control commands. The request message can comprise the control commands themselves and/or the execution requirements for an execution of the control commands by the device.

The checking module is configured to ascertain a check result regarding the executability of the control commands by the device. For this purpose, the checking module can check the device properties to the effect of whether the latter comply with the execution requirements and/or whether the device is currently able to execute the control commands. By way of example, on account of a high device capacity utilization owing to the processing of other control commands, the device may not be able to execute the control commands according to the execution requirements.

If for example the execution requirements predefine a time requirement for the processing or execution of the control commands or of the control transaction by the device, then the execution requirements or the confirmation message can comprise e.g., an indication regarding how quickly (e.g., a time duration) or when (e.g., a point in time) the device will, if appropriate, have executed the control commands or the control transaction or when the device is intended to have executed them. In order to ascertain the time duration or the point in time, even further parameters can be taken into account. By way of example, the execution duration, which e.g., is generally predefined by the execution requirements, can be calculated for a respective device by the determining module e.g., in such a way that optionally a buffer time is present in order that the corresponding control commands or control transaction can still be executed by a second device in a timely manner. By way of example, an initial predefinition is that a transaction or the control commands thereof be executed within 8 h. Four of the nodes have declared themselves to be ready to execute the transaction. If the first node does not communicate a confirmation for the execution (e.g., as an execution confirmation transaction) after 2 h, the corresponding control commands are communicated to the second node by the determining module or providing module.

Accordingly, on the basis of the confirmation messages, the determining module can once again adapt the execution requirements for the corresponding devices and provide them together with the control commands or the control transaction to a corresponding device.

Even further factors can be taken into account for the calculation of the time duration or of the point in time:
- A communication delay caused e.g., by the data replication mechanism of the distributed database system, and/or
- a processing time of the nodes for the control commands or control transactions, which is stored e.g., on the basis of the confirmation message and the indications stored therein by the corresponding device regarding the processing or execution of the control commands or control transactions.

The transmitting module is configured to transmit a confirmation message for the executability of the control commands by the device on the basis of the check result. The device transmits said confirmation message to the apparatus V. The confirmation message comprises for example a confirmation that the device can execute the control commands, or else a rejection in that the device is currently or generally not able to execute the control commands while complying with the execution requirements. The confirmation message can additionally also comprise current device properties of the device.

The device comprises the second receiving module, for example, if the request message does not comprise the control commands, for example. In such a case, the request message can comprise e.g., the execution requirements and/or a reference to a storage location of the control commands. The second receiving module is then configured e.g., to receive the control commands and/or a control transaction having the control commands.

If e.g., the execution requirements for the control commands have been adapted once again, then the device or the checking module can once again check the executability of the control commands on the basis of the execution requirements. If the executability of the control commands or of the control transaction cannot be confirmed, then a corresponding message is transferred to the apparatus V e.g., as a transaction of the blockchain BC. If the executability of the control commands or of the control transaction cannot be confirmed, then a corresponding message is transferred to the apparatus V, e.g., as a transaction of the blockchain BC. If the executability can be confirmed, the corresponding control commands or the control transaction are/is transferred to the execution module.

The execution module is configured e.g., to execute the control commands and/or the control transaction, wherein the execution module is configured to provide an execution confirmation message regarding the execution of the control commands. The execution confirmation message can be stored e.g., as a transaction in the network application (e.g., the blockchain BC).

In one variant, the execution module is configured to check the control commands and/or the control transaction as to whether the corresponding control commands of the request message are involved. For this purpose, the request message can comprise e.g., a checksum over the control commands and/or the control transaction or a corresponding checksum is communicated separately to the device. This checksum is taken as a basis for ascertaining whether the received control commands are actually the control commands of the request message.

Alternatively or additionally, the received control commands and/or the control transaction are/is cryptographically protected by a checksum in the form of a digital signature of the apparatus V. The digital signature is checked by the device before the execution of the control commands and/or the control transaction and an execution is effected e.g., if the digital signature was able to be checked successfully. If the checking is not successful, then for example the execution is prevented. What is then stored in the corresponding execution confirmation message is the fact of whether the control commands or the control transaction were/was executed and e.g., the result of the check of the digital signature was stored.

The device can for example additionally also comprise an update interface. By means of this interface (e.g., a USB interface or a Firewire interface or some other communication interface), for example firmware of the device can be updated and/or configuration data can be incorporated and/or log data/logging data of the device can be read out. By means of this interface or a further interface, the device can for example also be remote-controlled for maintenance purposes (e.g., remote maintenance). This may be relevant for example if the device has to be restarted.

The device can for example also comprise a timer (e.g., a clock). Said timer can be used e.g., to establish whether the confirmation messages arrived in a timely manner.

The device can for example additionally also comprise a fan, e.g., for cooling the modules or the components of the device.

The device can for example additionally also comprise one further component or a plurality of further components, such as for example a processor, a storage unit, further communication interfaces (e.g., Ethernet, WLAN, USB, Fieldbus, PCI), an input device, in particular a computer keyboard or a computer mouse, and a display device (e.g., a monitor). The processor can comprise for example a plurality of further processors which can be used in particular for realizing further exemplary embodiments.

It is for example also possible for specific classes or types of transactions to be validated by means of embodiments of the invention. These transactions comprise for example a specific type of control commands, to which corresponding execution requirements are allocated in each case. By way of example, these types of control commands can be specific manufacturing steps of identical type (e.g., 3D printing of a component part, milling of a specific geometry into a workpiece). These types of transactions comprise for example particular critical control commands which are permitted to be executed by a device e.g., only with strict compliance with execution requirements.

The devices confirm in their confirmation messages that they execute e.g., this type of transaction in a guaranteed manner within a time window.

Embodiments of the invention afford the possibility of using a blockchain for industrial application primarily in the manufacturing sector. In this case, for example temporal requirements can be predefined by the configurability and the selectability of the validation and/or transfer. The distributed database system validates e.g., only those transactions which can be executed by a corresponding blockchain-based manufacturing system, e.g., by virtue of a predefined number of nodes confirming that they execute said transactions.

Embodiments of the invention are suitable in particular for systems of cyberphysical systems and/or IoT applications of the blockchain in which at least one device is intended to execute a control action by means of control commands, the execution being subject to certain requirements.

Figure 3:
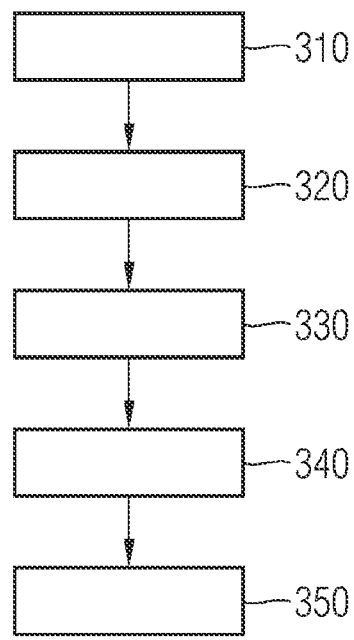
FIG. 3 shows a further exemplary embodiment of the invention.

FIG. 3 shows a further exemplary embodiment of the invention, which is illustrated as a flow diagram for a method.

The method is realized in a computer-aided manner.

Specifically, a method for the computer-aided or computer-implemented provision of a control transaction is shown in this exemplary embodiment. The method is, in particular, a method for providing a validated control transaction by means of a blockchain.

The method comprises a first method step 310 for receiving a transaction, wherein the transaction comprises control commands.

The method comprises a second method step 320 for determining one device or a plurality of devices which in each case wholly or partly execute the control commands.

The method comprises a third method step 330 for communicating a request message for execution of the corresponding control commands to the device or the plurality of devices.

The method comprises a fourth method step 340 for receiving confirmation messages, wherein the confirmation messages are responses of the device or of the plurality of devices to the request message.

The method comprises a fifth method step 350 for providing the transaction and/or the control commands as control transaction or as a plurality of control transactions on the basis of the confirmation messages.

Figure 4:
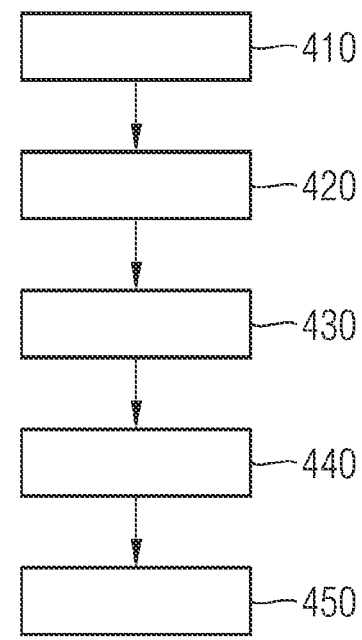
FIG. 4 shows a further exemplary embodiment of the invention.

FIG. 4 shows a further exemplary embodiment of the invention, which is illustrated as a flow diagram for a method.

The method is realized in a computer-aided manner.

Specifically, a method for the computer-aided or computer-implemented execution of a control transaction by a device is shown in this exemplary embodiment. The method is, in particular, a method for executing a validated control transaction by means of a node of a network application (e.g., of a blockchain).

The method comprises a first method step 410 for receiving a request message for execution of control commands by a device.

The method comprises a second method step 420 for ascertaining a check result regarding an executability of the control commands by the device.

The method comprises a third method step 430 for transmitting a confirmation message for the executability of the control commands by the device on the basis of the check result.

The method comprises a fourth method step 440 for receiving the control commands and/or a control transaction with the control commands.

The method comprises a fifth method step 450 for executing the control commands and/or the control transaction.

In a further exemplary embodiment, not shown in a figure, the apparatus comprises:
for example a first receiving module, wherein
    for example the first receiving module is configured for receiving a transaction,
    for example the transaction comprises control commands,
    for example the control commands are intended to be executed by one or a plurality of devices of a network application;
for example a determining module, wherein
    for example the determining module is configured to determine one device or a plurality of devices which in each case wholly or partly execute the control commands,
    for example the determining module is configured to communicate to the device or the plurality of devices a request message for execution of the corresponding control commands,
for example a second receiving module, wherein
    for example the second receiving module is configured for receiving confirmation messages,
    for example the confirmation messages are responses of the device or of the plurality of devices to the request message;
for example a providing module, wherein
    for example the providing module is configured to provide the transaction and/or the control commands on the basis of the confirmation messages as control transaction or as a plurality of control transactions.

In a further exemplary embodiment, not shown in a figure, the apparatus comprises:
for example a first receiving module, wherein
    for example the first receiving module is configured for receiving a transaction,
    for example the transaction comprises control commands,
    for example the control commands are intended to be executed by one or a plurality of devices of a network application;

for example a determining module, wherein
for example the determining module is configured to determine one device or a plurality of devices which in each case wholly or partly execute the control commands,
for example the determining module is configured to communicate to the device or the plurality of devices a request message for execution of the corresponding control commands,
for example a second receiving module, wherein
for example the second receiving module is configured for receiving confirmation messages,
for example the confirmation messages are responses of the device or of the plurality of devices to the request message;
for example a providing module, wherein
for example the providing module is configured to mark the transaction and/or the control commands on the basis of the confirmation messages and to provide same as marked control transaction or as a plurality of marked control transactions.

By this means, for example, the control transaction(s) or the control commands of a control transaction for which the executability has been confirmed can be marked by the providing module. By this means, transactions (e.g., control commands of control transactions or the corresponding control transactions) whose execution by the devices is possibly not possible can be differentiated from transactions (e.g., control commands of control transactions or the corresponding control transactions) which can be executed by the devices e.g., in a guaranteed manner.

In a further exemplary embodiment, not shown in a figure, the apparatus comprises:
for example a first receiving module, wherein
for example the first receiving module is configured for receiving a transaction,
for example the transaction comprises control commands,
for example the control commands are intended to be executed by one or a plurality of devices of a network application;
for example a determining module, wherein
for example the determining module is configured to determine one device or a plurality of devices which in each case wholly or partly execute the control commands,
for example the determining module is configured to communicate to the device or the plurality of devices a request message for execution of the corresponding control commands,
for example a second receiving module, wherein
for example the second receiving module is configured for receiving confirmation messages,
for example the confirmation messages are responses of the device or of the plurality of devices to the request message;
for example a providing module, wherein
for example the providing module is configured to select the transaction and/or the control commands on the basis of the confirmation messages and to provide same as selected control transaction or as a plurality of selected control transactions.

By this means, for example, the control transaction(s) or the control commands of corresponding control transactions for which the executability has been confirmed can be selected by the providing module. By this means, e.g., transactions (e.g., control commands of control transactions or the corresponding control transactions) whose execution by the devices has been confirmed can be provided exclusively by the providing module. Transactions for which no confirmation regarding their executability is present in the confirmation messages are then not provided as transactions, for example.

In a further exemplary embodiment, not shown in a figure, the device comprises:
for example a first receiving module, wherein for example the first receiving module is configured to receive a request message for execution of control commands;
for example a checking module is configured to ascertain a check result regarding the executability of the control commands by the device;
for example a transmitting module, wherein for example the transmitting module is configured to transmit a confirmation message for the executability of the control commands by the device on the basis of the check result;
for example a second receiving module, wherein for example the second receiving module is configured to receive the control commands and/or a control transaction with the control commands;
for example an execution module, wherein
for example the execution module is configured to execute the control commands and/or the control transaction,
for example the execution module is configured to provide an execution confirmation message regarding the execution of the control commands.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

[1]
Andreas M. Antonopoulos "Mastering Bitcoin: Unlocking Digital Cryptocurrencies", O'Reilly Media, December 2014
[2]
Roger M. Needham, Michael D. Schroeder "Using encryption for authentication in large networks of computers" ACM: Communications of the ACM. Volume 21, No. 12 Dec. 1978,
[3]
Ross Anderson "Security Engineering. A Guide to Building Dependable Distributed Systems" Wiley, 2001
[4]
Henning Diedrich "Ethereum: Blockchains, Digital Assets, Smart Contracts, Decentralized Autonomous Organizations", CreateSpace Independent Publishing Platform, 2016
[5]
"The Ethereum Book Project/Mastering Ethereum" https://github.com/ethereumbook/ethereumbook, version as at Oct. 5, 2017
[6]
Leemon Baird
"The Swirlds Hashgraph Consensus Algorithm: Fair, Fast, Byzantine Fault Tolerance", Swirlds Tech Report SWIRLDS-TR-2016-01, May 31, 2016

[7]
Leemon Baird
"Overview of Swirlds Hashgraph",
May 31, 2016
[8]
Blockchain Oracles
https://blockchainhub.net/blockchain-oracles/
Version at Mar. 14, 2018
[9]
Joseph Poon, Thaddeus Dryja: The Bitcoin Lightning Network: Scalable Off-Chain Instant Payments. Jan. 14, 2016, retrieved on Jun. 30, 2018 (PDF; 3 MB, English).

The invention claimed is:

1. An apparatus, said apparatus comprising:
a first receiving module, wherein
the first receiving module is configured for receiving a transaction,
the transaction comprises control commands,
the control commands are intended to be executed by one or more devices of a network application;
a determining module, wherein
the determining module is configured to determine the one or more devices which in each case wholly or partly execute the control commands,
the determining module is configured to communicate to the one or more devices a request message directing the one or more devices to execute the control commands,
a second receiving module, wherein
the second receiving module is configured for receiving confirmation messages,
the confirmation messages are responses from the one or more of devices to the request message; and
a providing module, wherein
the providing module is configured to select and mark as executable exclusively the transaction and/or the control commands in response to said receiving the confirmation messages.

2. The apparatus as claimed in claim 1, wherein upon a validation being provided, the one or more control transactions is/are effected on the basis of the confirmation messages.

3. The apparatus as claimed in claim 1, wherein
the request message comprises execution requirements for an execution of the control commands by the one or more device, and/or
the execution requirements are predefined by the control commands and/or by the transaction and/or by a policy, and/or
the execution requirements predefine device-specific requirements for the one or more devices, and/or
the execution requirements predefine pre-executed control commands for an execution of the control commands by the one or more devices, and/or
the execution requirements comprise a time requirement that predefines a processing time guaranteed by a corresponding device.

4. The apparatus as claimed in claim 1, wherein a first confirmation message of the confirmation messages comprises current device properties of a first device of the one or more devices which transmitted the first confirmation message.

5. The apparatus as claimed in claim 1, wherein
the determining module comprises device properties for at least one device of the one or more devices, and/or
the determining module determines, on the basis of the device properties and/or the execution requirements and/or the transaction and/or the control commands, the one or more devices to which the request message is communicated, and/or
the device properties of a corresponding device are updated in the determining module in the event of a change in the device properties.

6. The apparatus as claimed in claim 1, wherein
a number of confirmation messages is predefined for one control command of the control commands and/or at least one portion of the control commands and/or selected control commands of the control commands, and/or
the predefined number of confirmation messages confirms an execution of the corresponding control commands on a plurality of different devices.

7. The apparatus as claimed in claim 1, wherein after an execution of corresponding control commands by a corresponding device, an execution confirmation message is stored.

8. The apparatus as claimed in claim 1, wherein
the apparatus comprises a confirmation module, and/or
the confirmation module is configured to confirm the execution of the control commands and/or control transactions, and/or
the confirmation is effected on the basis of the execution confirmation message and/or on the basis of the execution requirements.

9. The apparatus as claimed in claim 1, wherein the determining module is configured, in the event of an execution prerequisite not being complied with and/or in the event of an unsuccessful execution of a corresponding control transaction or of corresponding control commands by a corresponding device, to communicate the corresponding control transaction or the corresponding control commands to a further device for execution, and the further device having sent a confirmation message for the corresponding control commands or for the corresponding control transaction.

10. The apparatus as claimed in claim 1, wherein
the confirmation messages are taken as a basis for determining a sequential order for the processing, by the determining module, of the control commands comprised by the control transactions.

11. A device comprising:
a first receiving module, wherein the first receiving module is configured to receive a request message for execution of control commands;
a checking module, wherein the checking module is configured to ascertain a check result regarding the executability of the control commands by the device;
a transmitting module, wherein the transmitting module is configured to transmit a confirmation message for the executability of the control commands by the device on the basis of the check result;
a second receiving module, wherein the second receiving module is configured to receive the control commands and/or a control transaction with the control commands;
a providing module, wherein the providing module is configured to select and mark as executable exclusively the control transaction and/or the control commands in response receiving the confirmation message; and
an execution module, wherein the execution module is configured to execute the control commands and/or the control transaction, the execution module is configured to provide an execution confirmation message regarding the execution of the control commands.

12. A system, said system comprising:
an apparatus including:
    first receiving module, wherein
        the first receiving module is configured for receiving a transaction,
        the transaction comprises control commands,
        the control commands are intended to be executed by one or more devices of a network application;
    a determining module, wherein
        the determining module is configured to determine the one or more devices which in each case wholly or partly execute the control commands,
        the determining module is configured to communicate to the one or more devices a request message directing the one or more devices to execute the control commands,
    a second receiving module, wherein
        the second receiving module is configured for receiving confirmation messages,
        the confirmation messages are responses from the one or more devices to the request message;
    a providing module, wherein
        the providing module is configured to select and mark as executable exclusively by the providing module the transaction and/or the control commands in response to said receiving the confirmation messages; and
    said one or more devices comprising the device as claimed in claim 11.

13. The system as claimed in claim 12, wherein
the device and/or the devices and/or the apparatus are/is in each case one node or a plurality of nodes of a network application, and/or
the network application is a distributed database system comprising a blockchain, and/or
the transaction received by the first receiving module is an unvalidated transaction, and/or
the request message and/or the confirmation message and/or the execution confirmation message are/is in each case a transaction of the network application and/or messages that are transferred via a separate communication channel between the apparatus and one device of the one or more devices.

14. The system as claimed in claim 13, wherein the blockchain comprises N blocks with each block having a block header, wherein N is at least 3, and wherein the block header of block n includes a checksum of block n for n=2, . . . , N.

15. The device according to claim 11, wherein the confirmation message comprises a checksum over the executed control commands.

16. The device according to claim 11, wherein the device is required to satisfy to requirements which are specific to the device in order to be able to execute the control commands and/or the control transaction, and wherein the requirements include a location of the device selected from the group consisting of a country, a Global Positioning System (GPS) indicated location, and a postal Zone Improvement Plan (ZIP) code.

17. A computer-implemented method for providing a control transaction, said method comprising the following method steps:
    receiving a transaction, wherein the transaction comprises control commands;
    determining one or more devices which in each case wholly or partly execute the control commands;
    communicating a request message directing the one or more devices to execute the control commands;
    receiving confirmation messages, wherein
        the confirmation messages are responses from the one or more devices to the request message; and
    selecting and marking as executable exclusively the transaction and/or the control commands in response to said receiving the confirmation messages.

18. A computer program product, comprising a computer readable hardware storage device having computer readable program code stored therein, said program code executable by a processor of a computer system to implement a method, comprising program instructions for carrying out the method as claimed in claim 17.

19. A providing apparatus for the computer program product as claimed in claim 18, wherein the providing apparatus stores and/or provides the computer program product.

20. A computer-implemented method for executing a control transaction by a device, said method comprising the following method steps:
    receiving a request message for execution of control commands by the device;
    ascertaining a check result regarding an executability of the control commands by the device;
    transmitting a confirmation message for the executability of the control commands by the device on the basis of the check result;
    receiving the control commands and/or a control transaction with the control commands;
    selecting and marking as executable exclusively the control transaction and/or the control commands in response to receiving the confirmation message; and
    executing the control commands and/or the control transaction.

* * * * *